(12) United States Patent
Chen et al.

(10) Patent No.: US 10,904,783 B2
(45) Date of Patent: Jan. 26, 2021

(54) UPLINK CONTROL INFORMATION TRANSMISSION USING PUSCH IN ENHANCED CARRIER AGGREGATION

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US); Aleksandar Damnjanovic, Del Mar, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 14/995,437

(22) Filed: Jan. 14, 2016

(65) Prior Publication Data
US 2016/0212649 A1 Jul. 21, 2016

Related U.S. Application Data

(60) Provisional application No. 62/104,671, filed on Jan. 16, 2015.

(51) Int. Cl.
*H04W 24/10* (2009.01)
*H04L 1/00* (2006.01)
(Continued)

(52) U.S. Cl.
CPC ............ *H04W 24/10* (2013.01); *H04L 1/003* (2013.01); *H04L 1/0026* (2013.01);
(Continued)

(58) Field of Classification Search
None
See application file for complete search history.

(56) References Cited

U.S. PATENT DOCUMENTS 10,243,716 B2    3/2019   Kim et al.
2011/0305161 A1* 12/2011  Ekpenyong ........... H04L 1/0031
                                              370/252
(Continued)

FOREIGN PATENT DOCUMENTS

CN    101917259 A    12/2010
CN    103039026 A    4/2013
(Continued)

OTHER PUBLICATIONS

3GPP TSP RAN WG1 #70 R1-123470, Aug. 13-17, 2012.*
(Continued)

*Primary Examiner* — Yemane Mesfin
*Assistant Examiner* — Jeff Banthrongsack
(74) *Attorney, Agent, or Firm* — Arent Fox, LLP

(57) ABSTRACT

Enhanced carrier aggregation may require development of mechanisms to enable carrier aggregation for an increased number of component carriers. In an aspect of the disclosure, a method, a computer-readable medium, and an apparatus for wireless communication are provided. The apparatus may be a user equipment. The apparatus may receive, with an uplink grant, a request for channel state information. The apparatus determines the number of bits comprising the request. The determined number of bits may be based on or associated with the number of serving cells configured for the apparatus. The apparatus reports the channel state information in response to the request based on information in the determined number of bits.

42 Claims, 17 Drawing Sheets

(51) Int. Cl.
*H04L 1/18* (2006.01)
*H04L 1/16* (2006.01)
*H04L 5/00* (2006.01)
*H04L 27/26* (2006.01)
*H04W 72/04* (2009.01)

(52) U.S. Cl.
CPC .......... *H04L 1/1861* (2013.01); *H04L 1/1864* (2013.01); *H04L 1/1896* (2013.01); *H04L 5/0005* (2013.01); *H04L 5/0048* (2013.01); *H04L 5/0055* (2013.01); *H04L 5/0057* (2013.01); *H04L 27/2601* (2013.01); *H04W 72/0413* (2013.01); *H04L 1/1671* (2013.01)

(56) References Cited

U.S. PATENT DOCUMENTS

| | | | | |
|---|---|---|---|---|
| 2013/0310100 | A1* | 11/2013 | Lee | H04B 7/024 455/517 |
| 2014/0133418 | A1 | 5/2014 | Takeda et al. | |
| 2014/0334391 | A1* | 11/2014 | Khoshnevis | H04W 72/0413 370/329 |
| 2016/0183244 | A1* | 6/2016 | Papasakellariou | H04L 5/001 370/329 |

FOREIGN PATENT DOCUMENTS

| | | | |
|---|---|---|---|
| CN | 103503514 | A | 1/2014 |
| EP | 2587876 | A1 | 5/2013 |
| JP | 2015502686 | A | 1/2015 |
| JP | 2015520579 | A | 7/2015 |
| WO | 2013066049 | A1 | 5/2013 |
| WO | 2013172684 | A1 | 11/2013 |

OTHER PUBLICATIONS

International Search Report and Written Opinion—PCT/US2016/013650—ISA/EPO—dated May 2, 2016.

NEC Group: "Details of Aperiodic CSI Triggering", 3GPP Draft, R1-124289, 3rd Generation Partnership Project (3GPP), Mobile Competence Centre, 650, Route Des Lucioles, F-06921 Sophia-Antipolis Cedex, France, vol. RAN WG1, No. San Diego, Oct. 8, 2012-Oct. 12, 2012 Sep. 29, 2012 (Sep. 29, 2012), pp. 5, XP050662190, Retrieved from the Internet: URL:http://www.3gpp.org/ftp/tsg_ran/WG1_RL1/TSGR1_70b/Docs/ [retrieved on Sep. 29, 2012] the whole document.

Samsung: "Aperiodic CSI Triggering for CoMP", 3GPP Draft, R1-123470 Aperiodic CSI Triggering For Comp_Final, 3rd Generation Partnership Project (3GPP), Mobile Competence Centre, 650, Route Des Lucioles, F-06921 Sophia-Antipolis Cedex, France, vol. RAN WG1, No. Qingdao, China, Aug. 13, 2012-Aug. 17, 2012 Aug. 5, 2012 (Aug. 5, 2012), pp. 3, XP050661349, Retrieved from the Internet: URL:http://www.3gpp.org/ftp/tsg_ran/WG1_RL1/TSGR1_70/Docs/ [retrieved on Aug. 5, 2012] section 2, pp. 1-2.

* cited by examiner

UPLINK CONTROL INFORMATION TRANSMISSION USING PUSCH IN ENHANCED CARRIER AGGREGATION

CROSS-REFERENCE TO RELATED APPLICATION

This application claims the benefit of U.S. Provisional Application Ser. No. 62/104,671, entitled "UPLINK CONTROL INFORMATION TRANSMISSION USING PUSCH IN ENHANCED CARRIER AGGREGATION" and filed on Jan. 16, 2015, which is expressly incorporated by reference herein in its entirety.

BACKGROUND

Field

The present disclosure relates generally to communication systems, and more particularly, to transmission of uplink control information (UCI).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Traditionally, wireless devices may use spectrum up to 20 MHz bandwidths allocated in a carrier aggregation of up to a total of 100 MHz (5 component carriers) used for transmission in each direction. In order to support carrier aggregation with more than five component carriers, a new approach for uplink control information transmission is desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Enhanced carrier aggregation may require development of physical layer specifications for PUCCH on secondary cell, and mechanisms to enable LTE carrier aggregation for an increased number of component carriers for the DL and the UL, e.g., 32 component carriers for the DL and the UL may be specified. The mechanisms may include enhancements to DL control signaling for the increased number of component carriers, including both self-scheduling and cross-carrier scheduling, if any. The mechanisms may include enhancements to UL control signaling for the number of component carriers greater than five. These enhancements may include enhancements to support uplink control information (UCI) feedback on the PUCCH for the increased number of DL component carriers. For example, the enhancements may relate to UCI signaling formats that are necessary to support UCI feedback for more than five DL component carriers. The mechanisms may also include enhancements to support UCI feedback on the physical uplink shared channel (PUSCH) for more than five DL component carriers.

In an aspect of the disclosure, a method, a computer-readable medium, and an apparatus for wireless communication are provided. The apparatus may be a user equipment. The apparatus may receive, with an uplink grant, a request for channel state information. The apparatus determines the number of bits comprising the request. The determined number of bits may be associated with the number of serving cells configured for the apparatus. The number of bits determined for the request may be two when the number of serving cells configured for the apparatus is less than or equal to a threshold. The number of bits determined for the request may be at least three when the number of serving cells configured for the UE is greater than the threshold. The apparatus reports the channel state information in response to the request based on the determined number of bits.

In another aspect of the disclosure, a method, a computer-readable medium, and an apparatus for wireless communication are provided. The apparatus may be a base station. The apparatus determines the number of bits for requesting channel state information from a user equipment based on the number of serving cells configured for the user equipment. The apparatus generates an uplink grant comprising a request for the channel state information based on the determined number of bits. The apparatus transmits the uplink grant to the user equipment.

In one aspect of the disclosure, a method, a computer-readable medium, and an apparatus for wireless communication are provided. The apparatus receives data via at least two component carriers of aggregated component carriers. The aggregated component carriers may include at least six component carriers. The apparatus sends acknowledgment or negative acknowledgment feedback for the data received via the aggregated component carriers based on the number of component carriers in the aggregated component carriers, along with at least a PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
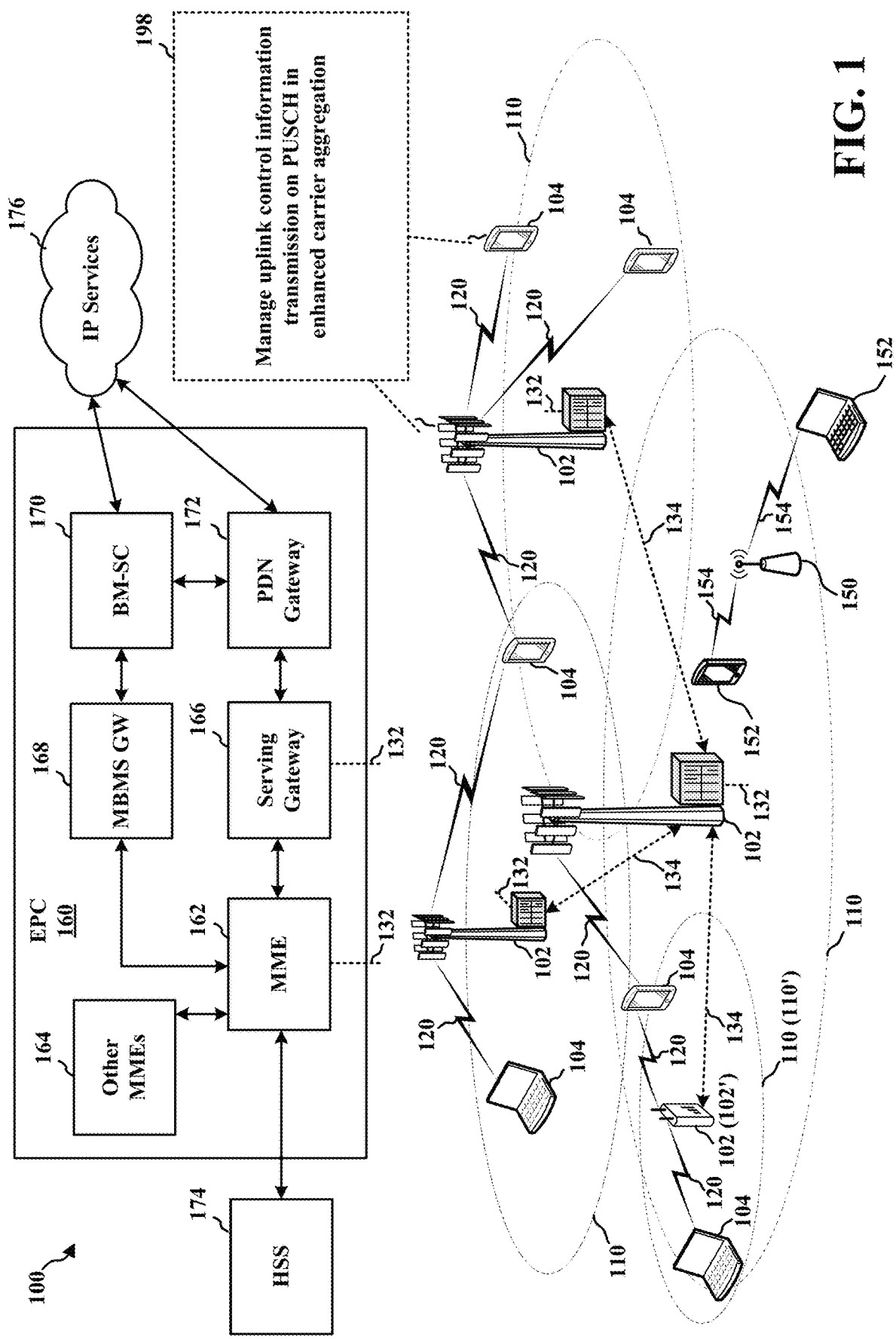
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to manage (198) uplink control information transmission on PUSCH in enhanced carrier aggregation. Details of the operations performed at 198 are described below with reference to FIGS. 4-17.

Figure 2:
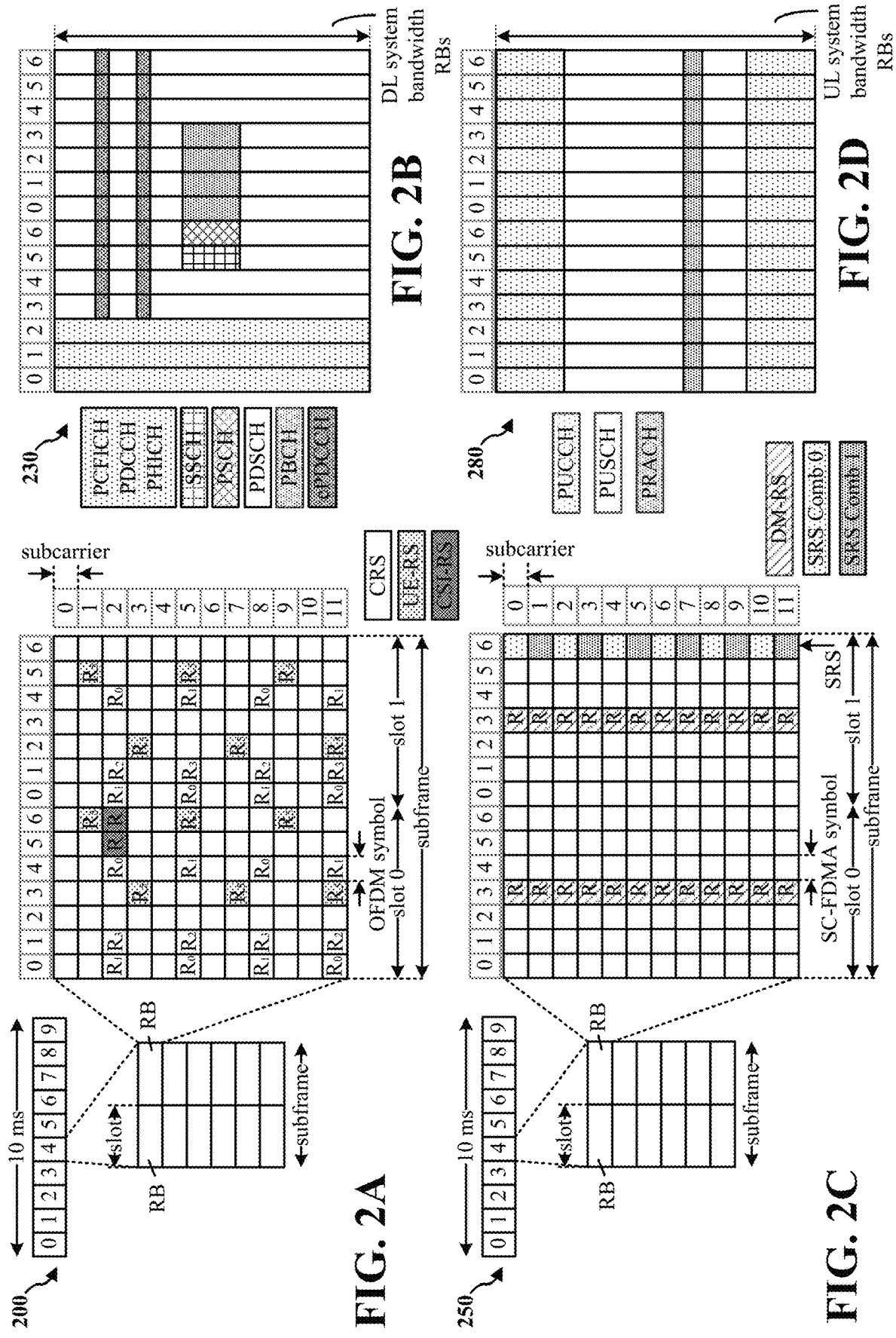
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3, of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
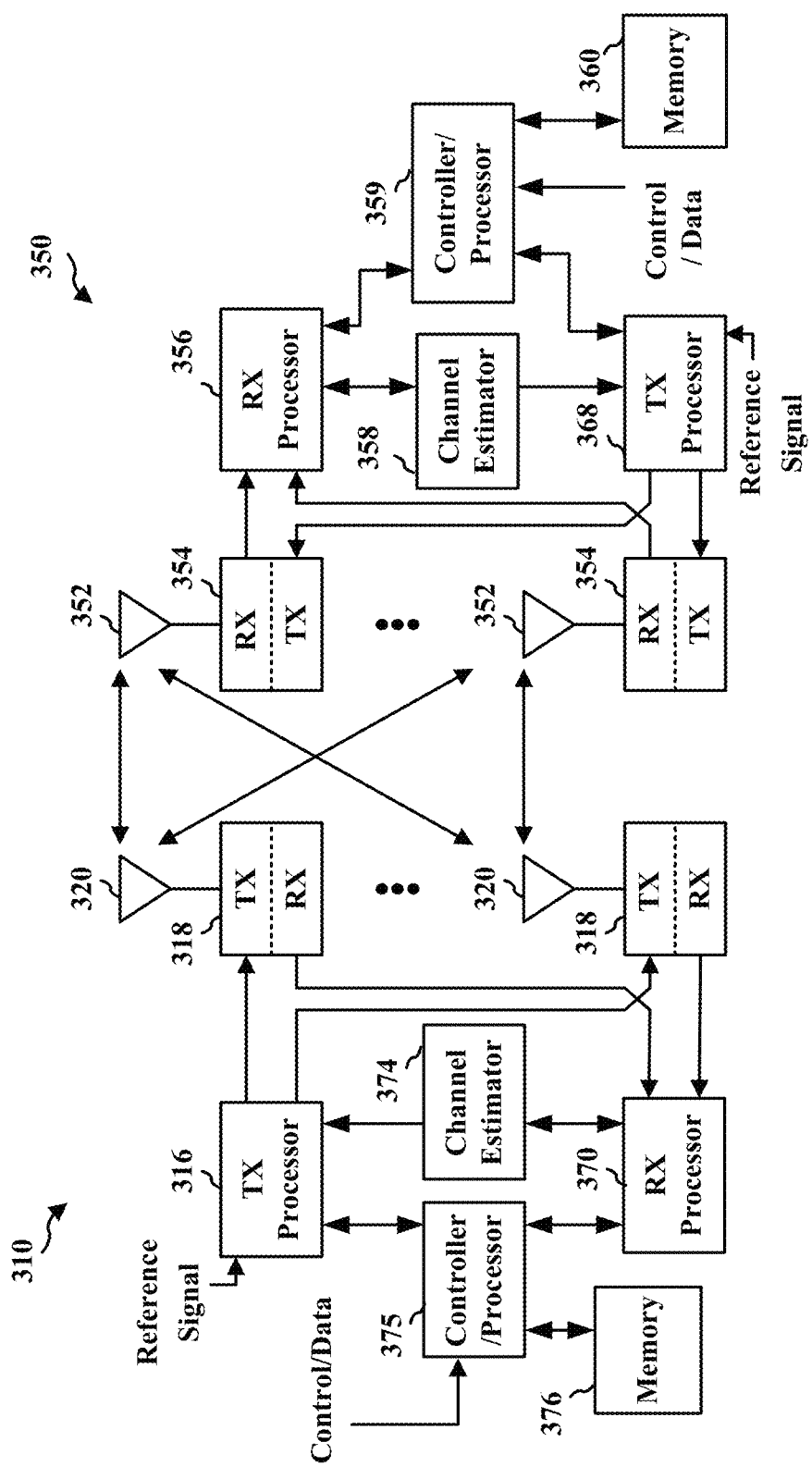
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric frequency-division duplexing (FDD) assignments conserve spectrum and are a good fit for the typically asymmetric bandwidth utilization by broadband subscribers. When carrier aggregation is used, there may be a number of serving cells, one for each component carrier.

Figure 4A:
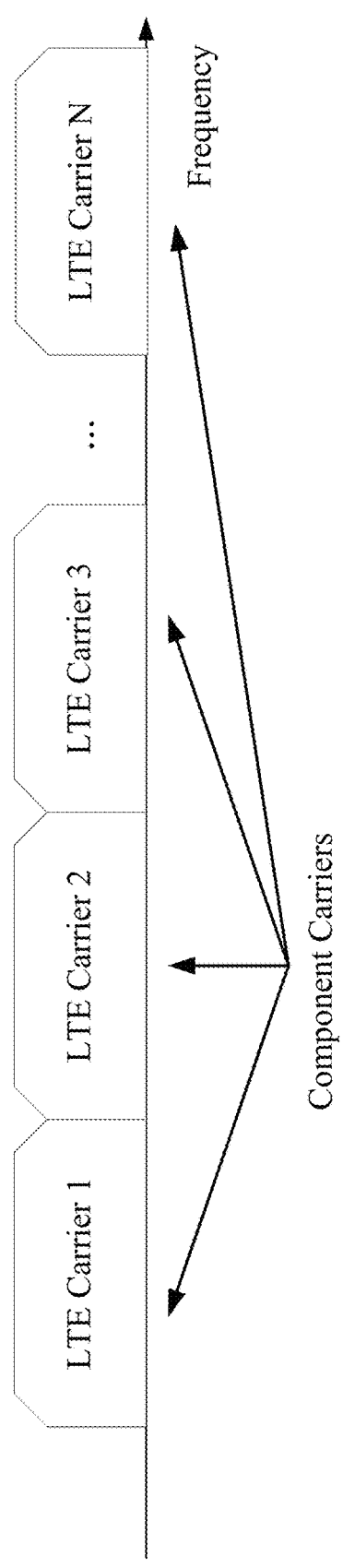
FIG. 4A is a diagram illustrating an example of continuous carrier aggregation.
Figure 4B:
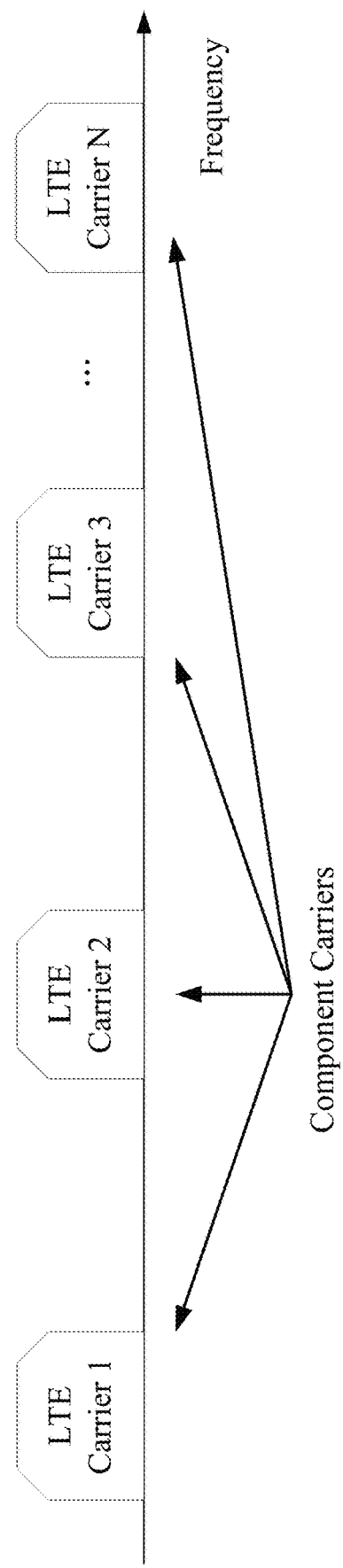
FIG. 4B is a diagram illustrating an example of non-continuous carrier aggregation.

Two types of carrier aggregation (CA) methods have been proposed, continuous CA and non-continuous CA. The two types of CA methods are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregates multiple LTE/component carriers to serve a single UE.

Traditionally, a UE may be configured with up to 5 component carriers (CCs) for carrier aggregation. Each CC may be backward compatible. The bandwidth of each CC may be up to 20 MHz. Because a UE can be configured with up to 5 CCs, up to 100 MHz may be configured for the UE.

The aggregated CCs may be all configured for FDD, or may be all configured for time-division duplexing (TDD). Alternatively, the aggregated CCs may be a mixture (e.g., combination) of at least one CC configured for FDD and at least one CC configured for TDD. Different CCs configured for TDD may have the same or different DL/UL configurations. Special subframes may be configured differently for different CCs configured for TDD.

Among the aggregated CCs, one CC is configured as the primary CC (PCC) for the UE. The PCC may be the only CC that carries a PUCCH and a common search space for the UE. All other CCs are referred to as secondary CCs (SCCs).

A PUCCH may be enabled on two CCs in CA for a UE. For example, in addition to the PCC, one SCC could carry a PUCCH as well. This may help to address, for example, dual-connectivity and PUCCH load balancing needs.

In some cases, cells (CCs) may not have ideal backhaul (e.g., connections between eNBs), and, consequently, tight coordination between the cells may not be possible due to limited backhaul capacity and non-negligible backhaul latency (e.g., tens of milliseconds). Dual-connectivity may address these issues. In dual-connectivity, cells are partitioned into two groups. The two groups are the primary cell group (PCG) and the secondary cell group (SCG). Each group may have one or more cells in CA. Each group has a single cell that carries a PUCCH. In the PCG, a primary cell carries a PUCCH for the PCG. In the SCG, a secondary cell carries a PUCCH for the SCG. This secondary cell may be referred to as also the pSCell.

Uplink control information (UCI) is separately conveyed to each group via the PUCCH in each group. A common search space is also additionally monitored in the SCG by a UE. Semi-persistent scheduling (SPS) (or semi-static scheduling) and scheduling request (SR) are supported in the SCG as well.

With respect to the PUSCH, a UE may be configured with one of two modes. The two modes are referred to below as Mode 1 and Mode 2. Under Mode 1, transmission of the PUCCH and transmission of the PUSCH do not occur simultaneously. The UE will transmit PUSCH only if PUSCH is present, and will transmit the PUCCH only if the PUSCH is not present. A single-carrier waveform is always maintained within a carrier. Under Mode 2, transmission of the PUCCH and transmission of the PUSCH may occur simultaneously. The UE may transmit the PUCCH and the PUSCH simultaneously in an uplink subframe. A single-carrier waveform is no longer maintained within a carrier.

When the PUSCH is present, UCI may be piggybacked (e.g., sent) on the PUSCH. Under Mode 1, all UCI will be piggybacked on the PUSCH. The UCI may include ACK/NACK feedback, periodic channel state information (P-CSI), and aperiodic CSI (or A-CSI). Under Mode 2, some UCI may still be piggybacked on the PUSCH. For example, if both ACK/NACK feedback and P-CSI are present, the ACK/NACK feedback is transmitted on the PUCCH, while the P-CSI is transmitted on the PUSCH.

In one configuration, resources for piggybacking UCI on the PUSCH may be determined based on PUSCH parameters (such as modulation and coding scheme, bandwidth, etc.), the payload size of UCI, and a layer-3 configured offset (configured separately for different types of UCI using 4-bit). In one configuration, the higher the offset value, the larger the amount of resources for UCI. UCI on PUSCH may have the same power offset and modulation order as the uplink shared channel (UL-SCH) (e.g., UL data) on PUSCH.

With respect to ACK/NACK feedback, the payload size may depend on the number of configured DL CCs in CA and the DL transmission mode of each of the CCs. For a CC configured for TDD, the payload size may further depend on the number of DL subframes of the CC that are associated with the uplink subframe. For example, when the CCs are configured for FDD, if there are 5 CCs in CA and each of the CCs is in a DL MIMO mode, 10 bits of ACK/NACK feedback may be piggybacked on the PUSCH as long as the UE detects at least one scheduled DL CC. As long as at least one CC is being detected by the UE, the payload size may be independent of the number of activated/deactivated CCs and/or the number of scheduled CCs. With respect to CSI, the payload size may depend on the corresponding CSI type.

There is a need for increasing the number of CCs beyond five to provide higher bandwidth and increased data rates. This may be referred to herein as enhanced CA, according to which a UE may be configured with more than five CCs (e.g., between six and 32 CCs) for CA. Enhanced CA may require development of physical layer specifications for PUCCH on SCell, and mechanisms to enable LTE CA for an increased number of CCs for the DL and the UL, e.g., 32 CCs for the DL and the UL may be specified. The mechanisms may include enhancements to DL control signaling for the increased number of CCs, including both self-scheduling and cross-carrier scheduling, if any. The mechanisms may include enhancements to UL control signaling for the number of CCs greater than five. These enhancements may include enhancements to support UCI feedback on the PUCCH for the increased number of DL carriers. For example, the enhancements may relate to UCI signaling formats that are necessary to support UCI feedback for more than five DL carriers. The mechanisms may also include enhancements to support UCI feedback on the PUSCH for more than five DL carriers.

Aspects of the disclosure are directed to one or more of the above-noted enhancements. Various aspects are described with reference to configurations of up to 32 CCs. However, one of ordinary skill in the art may recognize that features disclosed may be applicable to configurations of more than 32 CCs.

Figure 5:
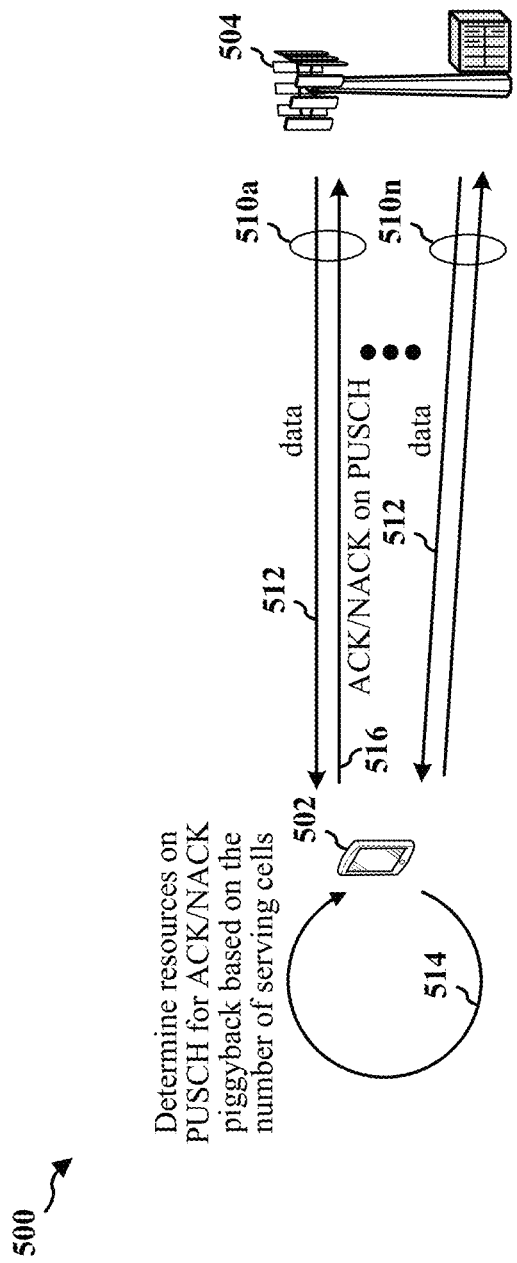
FIG. 5 is a diagram illustrating an example of determining resources on PUSCH for UCI feedback based on the number of serving cells configured for a UE.

FIG. 5 is a diagram 500 illustrating an example of determining resources on PUSCH for UCI feedback based on the number of serving cells configured for a UE 502. In this example, the UE 502 is connected to at least one base station 504. The UE 502 is configured with n serving cells 510a-510n. In one configuration, n may be greater than five. The UE 502 receives (at 512) data via at least two of the n serving cells 510a-510n. The UE 502 determines (at 514) resources on PUSCH for UCI (e.g., ACK/NACK) feedback based on the number of serving cells configured for the UE 502 (e.g., n). The operations performed at 514 will be further described below with reference to FIGS. 6-8. The UE 502 then sends (at 516) the UCI (e.g., ACK/NACK) feedback for the data received via at least two serving cells using the determined resources on PUSCH of a serving cell (e.g., the serving cell 510a).

Figure 6:
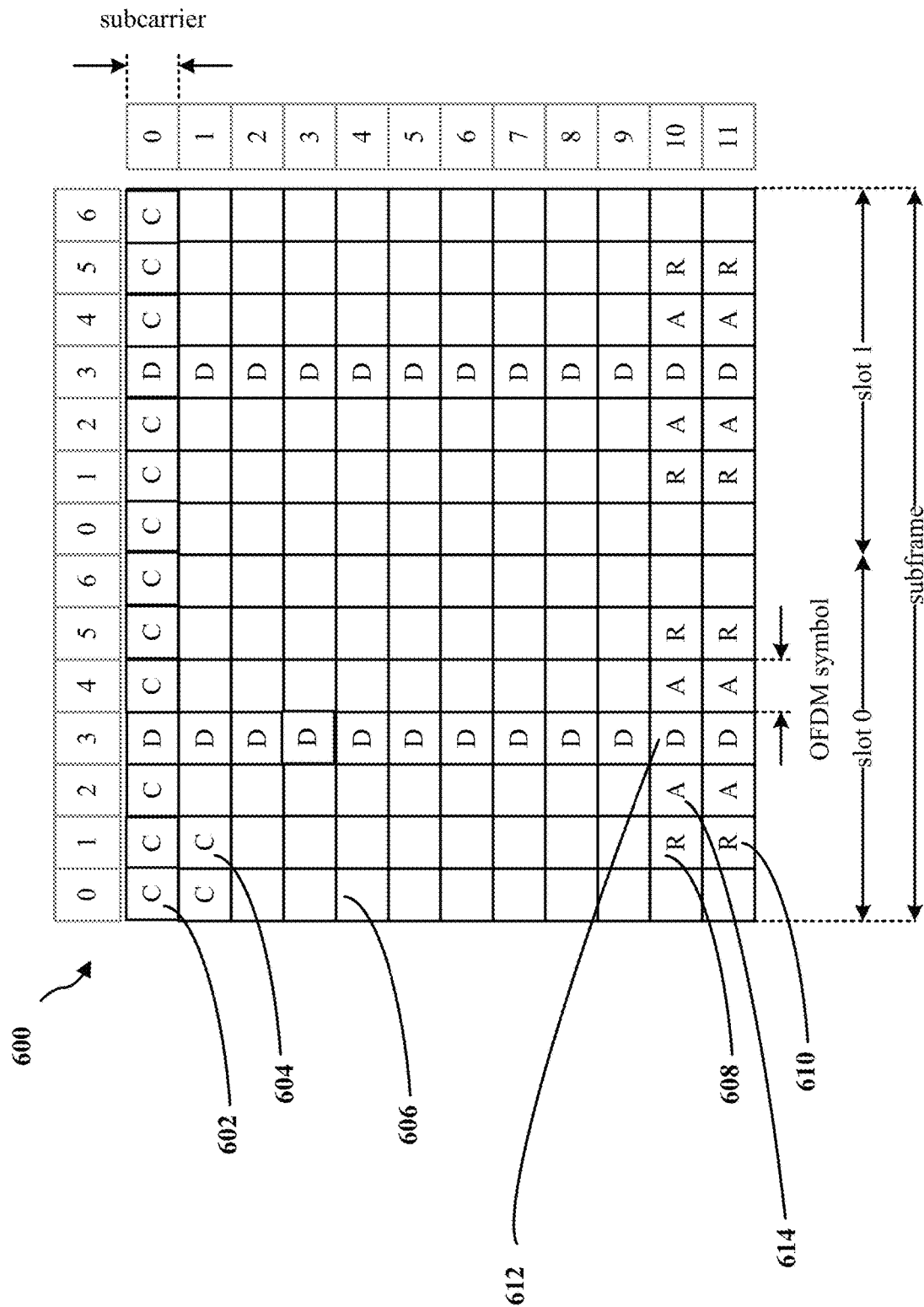
FIG. 6 illustrates an example of a structure of a PUSCH.

FIG. 6 illustrates an example of a structure 600 of a PUSCH. The PUSCH may contain data only, control information only, or data and control information multiplexed together. The control information may include channel quality indicator (CQI), precoding matrix indicator (PMI), rank indicator (RI), and ACK/NACK feedback.

In the PUSCH structure of FIG. 6, data and control information are multiplexed together. The CQI resources (e.g., 602, 604) are placed at the beginning of the UL-SCH data resources and mapped sequentially to all SC-FDMA symbols on one subcarrier before continuing on the next subcarrier. The CQI resources are followed by data resources (e.g., resource element 606). RI resources (e.g., 608, 610) are mapped around demodulation reference signal (DMRS) (e.g., 612). After modulation, ACK/NACK (e.g., 614) is punctured into data symbols around DMRS. As illustrated in FIG. 6, ACK/NACK may take 2 symbols per slot or 4 symbols per subframe (out of up to 12 symbols per subframe).

Aspects of the disclosure are directed to sending ACK/NACK feedback by a UE configured with at least 6 CCs for CA, along with at least a PUSCH. When more than 5 CCs are aggregated, the symbol allocation for ACK/NACK (e.g., the allocation described with reference to FIG. 6) may not be sufficient. For example, when 6 to 32 CCs are aggregated, the ACK/NACK payload size can be very large, e.g., on the order of 100 bits. Also, ACK/NACK has much tighter performance targets than the UL shared channel (UL-SCH) and other UCI.

Figure 7:
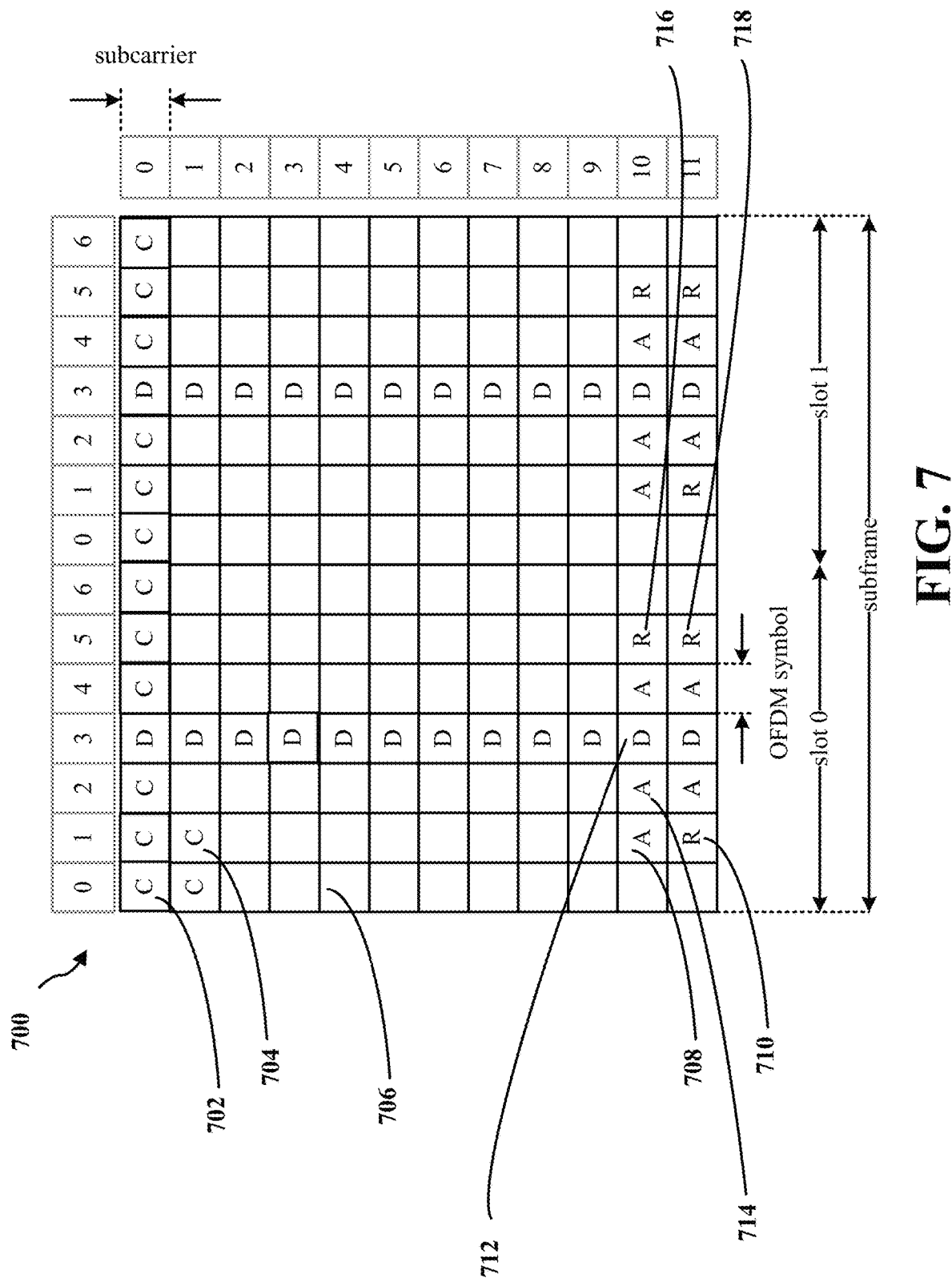
FIG. 7 illustrates an example of a structure of a PUSCH for enhanced carrier aggregation with more than five component carriers.

According to one aspect, the number of symbols that can be used for ACK/NACK feedback on PUSCH may be increased. FIG. 7 illustrates an example of a structure 700 of a PUSCH for enhanced carrier aggregation with more than five component carriers. In one configuration, the structure 700 shows the PUSCH resources allocated for ACK/NACK piggyback when the number of serving cells configured for a UE is greater than five. As will be described in more detail below, ACK/NACK may be punctured into five to eight data symbols around DMRS.

In the PUSCH structure of FIG. 7, data and control information are multiplexed together. The CQI resources (e.g., 702, 704) are placed at the beginning of the UL-SCH data resources and mapped sequentially to all SC-FDMA symbols on one subcarrier before continuing on the next subcarrier. The CQI resources are followed by data resources (e.g., resource element 706). RI resources (e.g., 710, 716, and 718) are mapped around DMRS (e.g., 712). After modulation, ACK/NACKs (e.g., 708 and 714) are punctured into data symbols around DMRS. The resource element 708 may have been originally allocated for carrying RI (see, e.g., resource element 608 of FIG. 6) but, as a result of the puncturing, instead carries ACK/NACK information.

Accordingly, one or more of the 4 resource elements (e.g., 708, 710, 716, and 718) originally allocated for piggybacking RI may be used to carry ACK/NACK. For example, with reference to FIG. 7, resource element 708, which was originally allocated for piggybacking RI, is used to piggyback ACK/NACK. Accordingly, the ACK/NACK feedback occupies five resource elements of slot 0 of the subframe, where one of the resource elements (e.g., 708) corresponds to a RI symbol of the subframe.

As another example, any selection of one or more of symbols in the first slot and/or in the second slot may be used to piggyback ACK/NACK. Accordingly, the ACK/NACK feedback may occupy two to six symbols of slot 0 or slot 1 of the subframe. This ACK/NACK feedback for received data is sent on the PUSCH.

According to another aspect, extending a number of symbols for ACK/NACK feedback on PUSCH can be performed regardless of whether or not the PUSCH carries uplink shared data (UL-SCH). In another aspect, extending a number of symbols for ACK/NACK feedback on PUSCH can be performed only when the PUSCH does not carry UL-SCH and carries only control information, e.g., the PUSCH is triggered for an A-CSI only transmission.

According to a further aspect, ACK/NACK feedback can be mapped from the highest indexed available resource elements (REs) and sequentially to REs of lower indices. This can be complementary to RI which is mapped from the lowest indexed REs and sequentially to REs of higher indices. Alternatively, ACK/NACK feedback can be mapped from the last RE for RI and sequentially to higher indexed REs.

The PUCCH carries control information from the UE when no PUSCH is allocated. According to one aspect, a parallel transmission of the PUCCH and the PUSCH may be enabled when the number of serving cells configured for the UE is greater than five. Accordingly, the PUCCH may carry control information from the UE even when the PUSCH is allocated. Accordingly, ACK/NACK feedback that is sent by a UE configured with at least 6 CCs for CA may be sent on the PUCCH, where the PUSCH and the PUCCH are in a same subframe.

According to another aspect, the ACK/NACK feedback may be jointly coded with other uplink control information on the PUSCH. For example, the ACK/NACK feedback may be jointly coded with at least P-CSI or A-CSI provided on the PUSCH.

According to another aspect, RI feedback, which may need to account for the CCs in more than five CCs (e.g., up to 32 CCs) that are configured with RI feedback, may also be configured to occupy more symbols in PUSCH, or as part of a PUCCH transmission in parallel with a PUSCH transmission.

For UCI piggybacked on PUSCH, the resources for UCI are determined based on PUSCH parameters (such as modulation and coding scheme, bandwidth, etc.), the payload size of UCI, and a layer-3 configured offset value that is configured separately for different types of UCI using 4 bits. The 4-bit offset is layer-3 configured per UCI type (e.g., ACK/NACK, CQI, RI). The offsets may be referred to herein as higher layer signaled indexes $I^{HARQ-ACK}_{offset}$, $I^{CQI}_{offset}$, and $I^{RI}_{offset}$.

Separate configuration may be further possible for single-input multiple-output (SIMO) vs. MIMO uplink transmissions, and/or for different power control subframe sets. The 4-bit offset provides a rough control for the eNB to tradeoff between uplink overhead and UCI reliability. This is due to the fact while channel conditions can be fast time-varying, RRC configuration is semi-static. This implies that the eNB has to pick an offset addressing the expected channel conditions in a relatively long duration, e.g., in the order of hundreds of milliseconds. Because the offset is an RRC configuration and, therefore, semi-static, the offset is chosen not accounting for fast fading channel conditions.

For TDD, the ACK/NACK payload size can also depend on the uplink subframe indices in a frame. With respect to ACK/NACK feedback, different uplink subframes may be associated with different numbers of downlink subframes. For example, for a first uplink subframe, the number of associated downlink subframes (M) may be equal to 2. For a second uplink subframe, the number of associated downlink subframes (M) may be equal to 1.

In the above example, when up to 32 CCs are aggregated, the first uplink subframe may need to provide ACK/NACK feedback of up to 128 bits, which is equal to 32*2 (in consideration of M=2)*2 (in consideration of spatial multiplexing (MIMO) for each downlink CC). For DL CA, multiple acknowledgment bits may be conveyed in the UL (e.g., one bit—or two bits in the case of spatial multiplexing—for each DL CC). The second uplink subframe may need to provide ACK/NACK feedback of up to 64 bits, which is equal to 32*1 (in consideration of M=1)*2 (in consideration of spatial multiplexing (MIMO)).

Different ACK/NACK payload sizes may require different layer-3 configured offsets for UCI transmitted on PUSCH. The higher the offset value, the larger the amount of resources for UCI. For example, a higher transmission offset $\beta^{HARQ-ACK}_{offset}$, derived based on a higher layer signaled index $I^{HARQ-ACK}_{offset}$, may correspond to a larger amount of resources for ACK/NACK feedback. UCI transmitted on PUSCH has the same power offset and modulation order as the UL-SCH) (which includes UL data) on the PUSCH.

As described earlier, the PUSCH is present in an uplink subframe that is associated with one or more downlink subframes. According to one aspect, transmission offsets for UCI piggybacking are separately configured for different values of M (different DL association sets) in a frame. For example, in a frame, a first uplink subframe may have M=1, and a second subframe may have M=2. Accordingly, a UE can be indicated to use a first higher layer signaled index $I^{HARQ-ACK}_{offset,1}$ for the first uplink subframe, and to use a second higher layer signaled index $I^{HARQ-ACK}_{offset,2}$ for the second uplink subframe. The offset may also be dynamically indicated in downlink control information (DCI), e.g., especially when the number of configured carriers is 6 or more.

Figure 8:
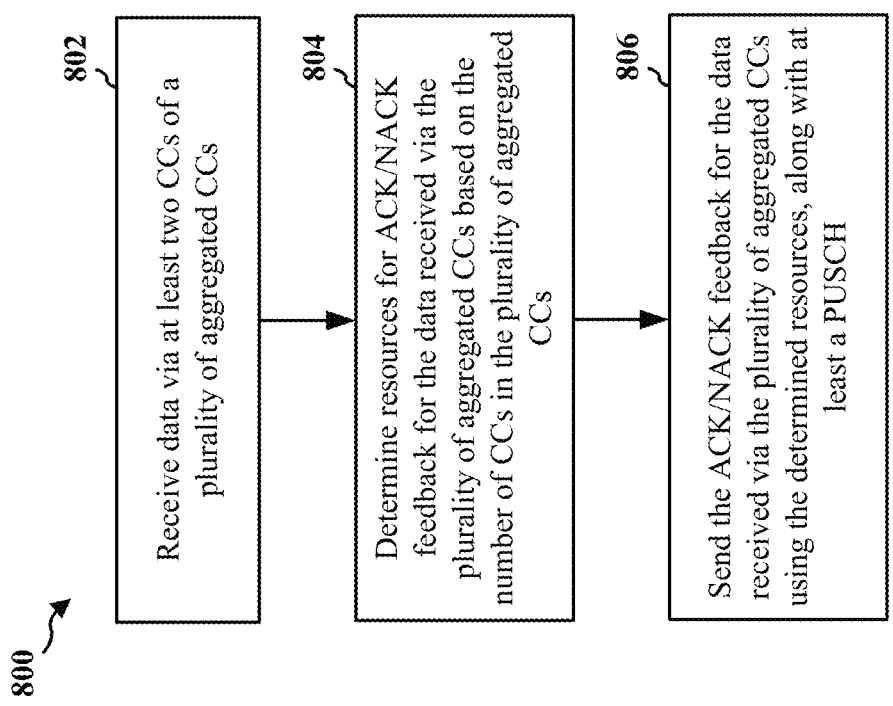
FIG. 8 is a flowchart of a method of determining resources for ACK/NACK piggyback based on the number of serving cells configured for a UE.

FIG. 8 is a flowchart 800 of a method of wireless communication. Specifically, this figure illustrates a method of determining resources for ACK/NACK piggyback based on the number of serving cells configured for a UE. The method may be performed by a UE (e.g., the UE 104, 350, 502, the apparatus 1402/1402'). At 802, the UE receives data via at least two CCs of a plurality of aggregated CCs. For example, the UE 502 receives data via at least two serving cells of the serving cells 510a-510n configured for the UE 502, as described above with reference to FIG. 5. The plurality of aggregated CCs includes at least six CCs.

At 804, the UE determines resources for ACK/NACK feedback for the data received via the plurality of aggregated CCs based on the number of CCs in the plurality of aggregated CCs. In one configuration, the number of symbols that can be used for ACK/NACK feedback on PUSCH may be increased based on the number of CCs configured for the UE. In one configuration, the ACK/NACK feedback occupies at least five symbols of a slot of a subframe. The at least five symbols may include at least one RI symbol of the subframe. In one configuration, ACK/NACK may be punctured into five to eight data symbols around DMRS based on the number of CCs configured for the UE, as described above with reference to FIG. 7. In one configuration, a parallel transmission of the PUCCH and the PUSCH may be enabled when the number of serving cells configured for the UE is greater than five. In one configuration, the ACK/NACK feedback may be jointly coded with other uplink control information on the PUSCH based on the number of CCs configured for the UE. For example, the ACK/NACK feedback may be jointly coded with at least periodic CSI or aperiodic CSI provided on the PUSCH. In one configuration, the ACK/NACK payload size may also depend on the uplink subframe indices in a frame. In one configuration, the PUSCH may be present in an uplink subframe that is associated with one or more downlink subframes. In such configuration, a higher layer signaled index may be configured based on the number of the one or more downlink subframes. In one configuration, different ACK/NACK payload sizes may require different layer-3 configured offsets for UCI transmitted on PUSCH.

At 806, the UE sends ACK/NACK feedback for the data received via the plurality of aggregated CCs using the determined resources, along with at least a PUSCH. For example, the ACK/NACK feedback may be sent along with the PUSCH described earlier with reference to structure 700 of FIG. 7. As described in earlier examples with reference to FIG. 7, when up to 32 CCs are aggregated, the ACK/NACK feedback in an uplink subframe associated with two downlink subframes may be 128 bits, and the ACK/NACK feedback in an uplink subframe associated with one downlink subframe may be 64 bits. In one configuration, the ACK/NACK feedback for the received data may be sent on the PUSCH. In one configuration, the ACK/NACK feedback for the data received may be sent on a PUCCH, and the PUSCH and the PUCCH may be in the same subframe.

A UE may be triggered to transmit aperiodic CSI (A-CSI) on the PUSCH. The PUSCH may also include the UL-SCH. If the PUSCH does not include the UL-SCH, the PUSCH may include only A-CSI. Alternatively, when the UL-SCH is not on the PUSCH, other UCI (e.g., ACK/NACK feedback) may also be transmitted along with the A-CSI.

A-CSI reporting may be triggered by a request which accompanies an UL grant. Depending upon different factors, the request for A-CSI reporting can comprise more or fewer bits. For example, if a UE is configured for CA, coordinated multipoint (CoMP), or enhanced interference mitigation traffic adaptation (eIMTA), the request may be a 2-bit A-CSI information field which accompanies an UL grants in the UE-specific search space and triggers A-CSI reporting. Otherwise, a 1-bit A-CSI information field may be provided for triggering A-CSI. The set of DL CCs for which reporting of A-CSI is triggered may be RRC configured.

A-CSI only transmission on the PUSCH (e.g., whether or not the UL-SCH is to be multiplexed with A-CSI) is implicitly indicated to the UE. In particular, A-CSI only transmission on the PUSCH may be triggered if: the MCS Index ($I_{MCS}$) is equal to 29; the A-CSI information field is set (to a non-zero value); and the transport block size ($N_{PRB}$) for PUSCH is less than or equal to 4 resource blocks (RBs) (for a 1-bit A-CSI information field, or a 2-bit A-CSI information field triggering one DL CC under CA or one CSI process under CoMP), or is less than or equal to 20 RBs (for a 2-bit A-CSI information field triggering more than one CC or more than 2 CSI processes). The differentiation of 4 RBs versus 20 RBs is to account for increased A-CSI payload size.

When there are 2 or more CCs with PUSCH in an uplink subframe, only one PUSCH CC may carry UCI. If a given PUSCH CC has A-CSI triggered, that PUSCH CC may be selected to carry UCI. In this regard, for any UL subframe, there is at most one PUSCH CC with A-CSI triggered. Otherwise, the selection of the PUSCH CC for UCI piggybacking may be based on the layer-3 configured cell index. Typically, the primary cell has the lowest cell index.

In the case of dual-connectivity, the UCI management is separately done (or performed) for the PCG and the SCG. For example, UCI that is piggybacked on a PUSCH in a particular group only includes UCI for CCs in that group. As another example, each group may separately have at most one PUSCH CC with A-CSI triggered.

Figure 9:
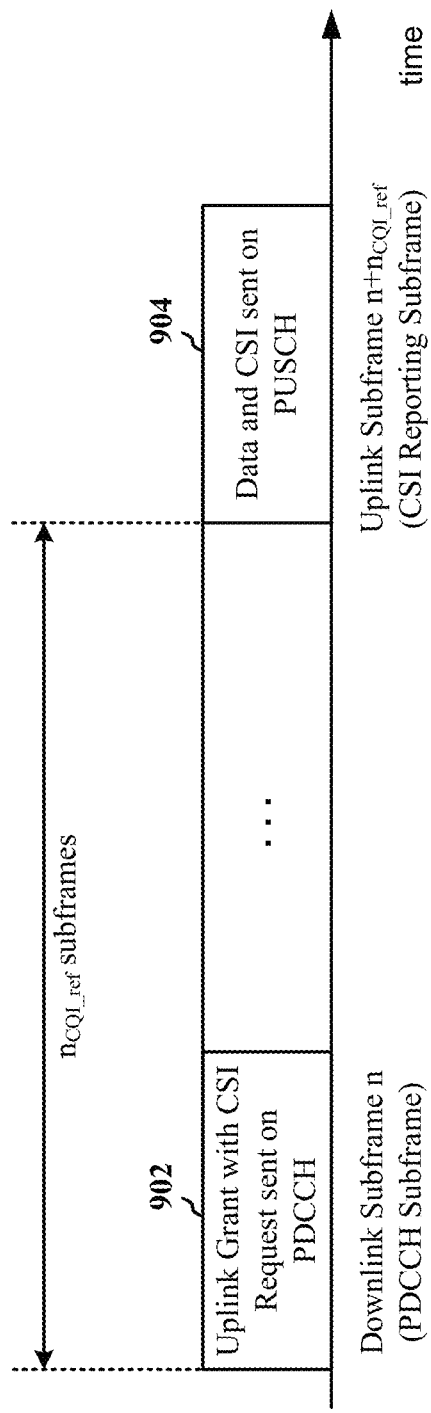
FIG. 9 illustrates A-CSI reporting for TDD.

FIG. 9 illustrates A-CSI reporting for TDD. In downlink subframe n, an eNB may send an uplink grant 902 on the physical downlink control channel (PDCCH) to a UE. The uplink grant 902 may include a CSI request. The UE may receive the uplink grant 902 including the CSI request in downlink subframe n. The UE may determine CSI based on a cell-specific reference signal (CRS), CSI reference signals (CSI-RS), and/or other signals received from the eNB in subframe n. The UE may then send CSI along with data on the PUSCH to the eNB in reporting subframe 904 (uplink subframe n+$n_{CQI\_ref}$). The parameter $n_{CQI\_ref}$ may be greater than or equal to 4.

The CSI request included in the uplink grant 902 may be 1 or 2 bits in length. The network (e.g., eNB) may explicitly request that an aperiodic channel-state report be transmitted on the UL-SCH by setting the bit(s) for the CSI request in the uplink grant 902. In the case of CA, the two bits CSI request may be used to indicate the DL CC for which the CSI should be reported. However, the 2-bit A-CSI triggering may only trigger up to 3 possible RRC configured sets of A-CSI reports and thus may experience limitations when used with a large number of CCs.

Possible meanings of the two-bit information field for CSI request are described below. If the binary value of the CSI request field is '00', then no CSI report is triggered. If the binary value of the CSI request field is '01', then a CSI report is triggered for the cell on which the trigger is sent. Accordingly, the value of '01' corresponds to a CSI process (or processes) of the serving cell. Therefore, in one example, it is possible to trigger A-CSI reporting for a serving cell by enabling A-CSI triggering using a control channel for the serving cell with the information field value of '01'. The remaining two binary values (of '10' and '11') may correspond to CSI process(es) of any serving cell configured for the UE. For example, if the binary value of the CSI request field is '10', then a CSI report may be triggered for a first set of serving cells configured by higher layers. Also, if the binary value of the CSI of the CSI request field is '11', then a CSI report may be triggered for a second set of serving cells configured by higher layers. The configurations corresponding to the binary values (of '10' and '11') are not serving cell dependent. The same set of RRC configurations may be always used for the values of '10' and '11' regardless of which serving cell the control channel is for.

Aspects of the disclosure are directed to facilitating request for A-CSI reporting when a UE is configured with at least 6 CCs for CA. It is possible that, when more than five CCs (e.g., up to 32 CCs) are aggregated, a CSI request field that has a length of, at most, two bits may not provide sufficient flexibility. According to one aspect, an uplink grant (e.g., uplink grant 902) includes a CSI request having a length that may be greater than 2 bits. For example, in order to address concerns relating to increases in downlink overhead, the length of the CSI request may be 2 to 4 bits. A CSI request having a length that is greater than 2 bits may provide greater flexibility in selecting the serving cell(s) for which A-CSI is reported.

The length of the CSI request may be based on a number of the CCs that are aggregated. More particularly, the length of the CSI request may be based on a comparison of the number of CCs with a threshold value. For example, the length of the CSI request may be 2 bits when the number of CCs is less than or equal to a threshold value, and the length of the CSI request may be 3 or more bits if the number of the CCs is greater than the threshold value. The threshold value may be 5. In this situation, the length of the CSI request may be 2 bits if the number of CCs is less than or equal to 5, and the length of the CSI request may be 3 or more bits if the number of the CCs is greater than 5.

In another example, the length of the CSI request may be equal to 3 bits if the number of CCs is less than or equal to a threshold value, and the length of the CSI request may be equal to 4 bits if the number of the CCs is greater than the threshold value. The threshold value may be equal to 10. In this situation, the length of the CSI request may be equal to 3 bits if the number of CCs is less than or equal to 10, and the length of the CSI request may be equal to 4 bits if the number of the CCs is greater than 10.

In one configuration, the length of the CSI request may be determined by taking into account whether the UE is configured for CoMP or eIMTA. For example, if a number of CSI-RS processes are configured on a CC due to CoMP, then the length of the CSI request may be further based on the number CSI-RS processes configured on the CC. For example, the length of the CSI request may be based on a sum of the number of the CCs that are aggregated and/or the number of CSI-RS processes configured on each CC. More particularly, the length of the CSI request may be based on a comparison of the noted sum with a threshold value. For example, the length of the CSI request may be equal to 3 bits if the noted sum is less than or equal to a threshold value, and the length of the CSI request may be equal to 4 bits if the noted sum is greater than the threshold value. The threshold value may be equal to 10. In this situation, the length of the CSI request may be equal to 3 bits if the noted sum is less than or equal to 10, and the length of the CSI request may be equal to 4 bits if the noted sum is greater than 10.

Alternatively, the length of the CSI request may be a function of the total configured number of CSI-RS processes for the UE. A CC that is not configured with an A-CSI process may be excluded from the determination of the length of the CSI request.

The CSI request field may be included in the DCI format 0 and DCI format 4. Therefore, increasing the length of the CSI request field may increase the length of the DCI format 0. The DCI format 0 is size-matched with the DCI format 1A. Therefore, increasing the length of the CSI request field may increase the length of the DCI format 1A as well.

According to various aspects that have been described, the length of the CSI request field may be increased to facilitate requests for A-CSI reporting. According to other aspects, the length of the CSI request field may not be increased. For example, the 2-bit CSI request field may be reused. However, the configurations corresponding to particular binary values (e.g., '10' and '11') may be serving cell dependent. For example, control channel of a first serving cell with a CSI request field of '10' and a control channel of a second serving cell also with a CSI request field of '10' may trigger different sets of A-CSI reports.

As another example, the length of the CSI request field may be maintained at 2 bits, but the field is interpreted in an SPS-like manner. For example, activation/deactivation is used to reconfigure different set(s) of A-CSI triggering.

As another example, the length of the CSI request field may be maintained at 2 bits. However, for request for transmissions of A-CSI only on PUSCH, other information fields in the DCI format 0 or DCI format 4 may be used to indicate different sets of A-CSI triggering and, therefore, provide more flexibility. For example, these other fields may include the 2-bit transmit-power control (TPC) information field for PUSCH, the 1-bit hopping flag, and/or the 3-bit DM-RS cyclic shift information field, which indicates phase rotation of the uplink demodulation reference signal used to support multi-user MIMO. Re-interpreting these information fields is possible since these information fields may be deemed to be less important in comparison with the need for more flexible A-CSI triggering.

Aspects of the disclosure are directed to determining a condition for the reporting of A-CSI for one or more serving cells based on a CSI request. The A-CSI may be reported without uplink shared data. The condition that is determined may be the number of RBs used for reporting the A-CSI.

There may be situations when there is no transport block for the UL-SCH and only the control information feedback for the current PUSCH reporting mode is transmitted by the UE. This may occur for values of $I_{MCS}$ greater than or equal to 29 and less than or equal to 31, if DCI format 0 is used and $I_{MCS}$ is equal to 29 or, if DCI format 4 is used and only 1 transport block (TB) is enabled and $I_{MCS}$ is equal to 29 for the enabled TB and the number of transmission layers is 1, and if: the "CSI request" bit field is 1 bit and is set to trigger an A-CSI report and the transport block size is less than or equal to 4 RBs; or the "CSI request" bit field is 2 bits and is triggering an A-CSI report for one serving cell, and the transport block size is less than or equal to 4 RBs; or the "CSI request" bit field is 2 bits and is triggering an A-CSI report for more than one serving cell, and the transport block size is less than or equal to 20 RBs; or the "CSI request" bit field is 2 bits and is triggering an A-CSI report for one CSI process, and the transport block size is less than or equal to 4 RBs; or the "CSI request" bit field is 2 bits and is triggering an A-CSI report for more than one CSI process, and the transport block size is less than or equal to 20 RBs.

According to one aspect, the number of RBs may be determined based on the number of triggered serving cells. For example, the number of RBs may be equal to 20 if the number of triggered serving cells is less than or equal to a first threshold value. The number of RBs may be equal to 40 if the number of triggered serving cells is greater than the first threshold and less than or equal to a second threshold. The number of RBs may be greater than 40 (e.g., no limitations) if the number of triggered serving cells is greater than the second threshold. The first threshold value may be equal to 5, and the second threshold value may be equal to 10.

According to another aspect, the number of RBs is based on a number of CSI-RS processes that are triggered. For example, the number of RBs may be equal to 20 if the number of CSI-RS processes is less than or equal to a first threshold value. The number of RBs may be equal to 40 if the number of CSI-RS processes is greater than the first threshold and less than or equal to a second threshold. The number of RBs may be greater than 40 (e.g., no limitations) if the number of CSI-RS processes is greater than the second threshold. The first threshold value may be equal to 5, and the second threshold value may be equal to 10.

According to another aspect, the number of RBs is based on both the number of triggered serving cells and the number of CSI-Reference Signal (CSI-RS) processes triggered. In particular, the number of RBs may be determined based on a sum of the number of triggered serving cells and the number of CSI-Reference Signal (CSI-RS) processes triggered. For example, the number of RBs may be equal to 20 if the noted sum is less than or equal to a first threshold value. The number of RBs may be equal to 40 if the noted sum is greater than the first threshold and less than or equal to a second threshold. The number of RBs may be greater than 40 (e.g., no limitations) if the noted sum is greater than the second threshold. The first threshold value may be equal to 5, and the second threshold value may be equal to 10.

Regarding the number of A-CSI triggers per UL subframe, there can be up to one trigger per UL subframe in the case of CA. Similarly, there can be up to one trigger per UL subframe in the case of dual-connectivity, involving primary and secondary groups. Such rules may be acceptable, unless a need for CC-specific A-CSI triggering arises.

From the perspective of a UE, it may be difficult to provide feedback for more than five CCs in one UL subframe. For example, it may be difficult to simultaneously measure and report A-CSI for more than five CCs (e.g., up to 32 CCs) in a single UL subframe. Aspects of the present disclosure are directed to easing this difficulty.

According to one aspect, the UE may be configured with a measurement delay which depends on the number of CCs. In general, a larger number of CCs corresponds to a larger measurement delay. With reference back to FIG. 9, the measurement delay may be quantified in units of subframes (e.g., the parameter $n_{CQI\_ref}$). Accordingly, the reporting subframe (e.g., subframe 904) can be offset by a greater number of subframes with respect to a reference subframe (e.g., the subframe corresponding to uplink grant 902). The number of subframes may be assigned by comparing the number of CCs with one or more threshold values. For example, if the number of CCs is greater than or equal to 1 and less than or equal to 5, then the measurement delay (e.g., $n_{CQI\_ref}$) may be set to 4 subframes. If the number of CCs is greater than or equal to 6 and less than or equal to 10, then the measurement delay (e.g., $n_{CQI\_ref}$) may be set to 5 subframes. If the number of subframes is greater than or equal to 11, then the measurement delay (e.g., $n_{CQI\_ref}$) may be set to 6 subframes.

As disclosed, the measurement delay may be assigned depending on the number of aggregated CCs. Similarly, according to another aspect, the measurement delay (e.g., the number of subframes) may be based on a number of configured CSI-RS processes. Alternatively (or in addition), the reporting of the A-CSI may be performed over multiple (e.g., two or more) reporting subframes. For example, the reporting of the A-CSI for at least one CC may be sent in one reporting subframe (e.g., a first subframe), and the reporting of the A-CSI for at least another CC may be sent in another reporting subframe (e.g., a subsequent second subframe).

According to a particular aspect, each reporting subframe may include current (or fresh) reporting of A-CSI for up to a pre-determined maximum number of fresh A-CSI reports. Therefore, a particular subframe may include current (or fresh) reporting of A-CSI for up to the pre-determined maximum number of CSI processes and outdated (e.g., older or earlier-reported) reporting of A-CSI for the remaining CSI processes.

Accordingly, CSI reporting for more than five CCs (e.g., up to 32 CCs) may be performed in a time-division-multiplexed manner. For example, if reporting of A-CSI for up to 8 CCs is provided in a given reporting subframe, then reports for 32 CCs can be provided over four different UL subframes. Such time-domain partition of A-CSI reporting for different CCs may be semi-static (e.g., by a RRC configuration such that A-CSI for a CC can only occur in a set of subframes) or dynamic (e.g., by a trigger in a DCI, where the trigger can only trigger a certain set of CCs for A-CSI reporting).

Alternatively (or in addition), reporting of A-CSI may be simplified for at least one or more CCs. For example, a complete (e.g., full) report of the A-CSI may be sent for at least one CC, and a less than complete report (e.g., a partial report, a restricted report, a reduced report, or CSI reporting mode with relaxed processing) of the A-CSI may be sent for at least another CC. For example, a complete report for the A-CSI may be sent for a primary cell and for secondary cells having the lowest 4 secondary cell IDs. A partial report, at most, may be sent for other secondary cells (e.g., secondary cells having higher cell IDs). The partial report may include CSI relating to rank 1 and wideband CSI/PMI (e.g., wideband CQI report or wideband CQI report with wideband PMI). Relative to the complete report, the partial report may lack frequency selective CQI information, lack frequency selective PMI information, include a reduced set of PMI or rank indicators, include a larger frequency subband size, and/or include a differential CQI value.

As another example, for cells of the same band (e.g., the same operating frequency band, or the same operating spectrum), a complete report for the A-CSI may be sent for one of these cells. A partial report, at most, may be sent for other cells of this band. Examples of individual frequency bands may include LTE, LTE-Unlicensed (LTE-U), etc. LTE frequency bands may be at 700 MHz or 2 GHz. LTE-U frequency bands may be at 2.4 GHz or 5 GHz.

Figure 10:
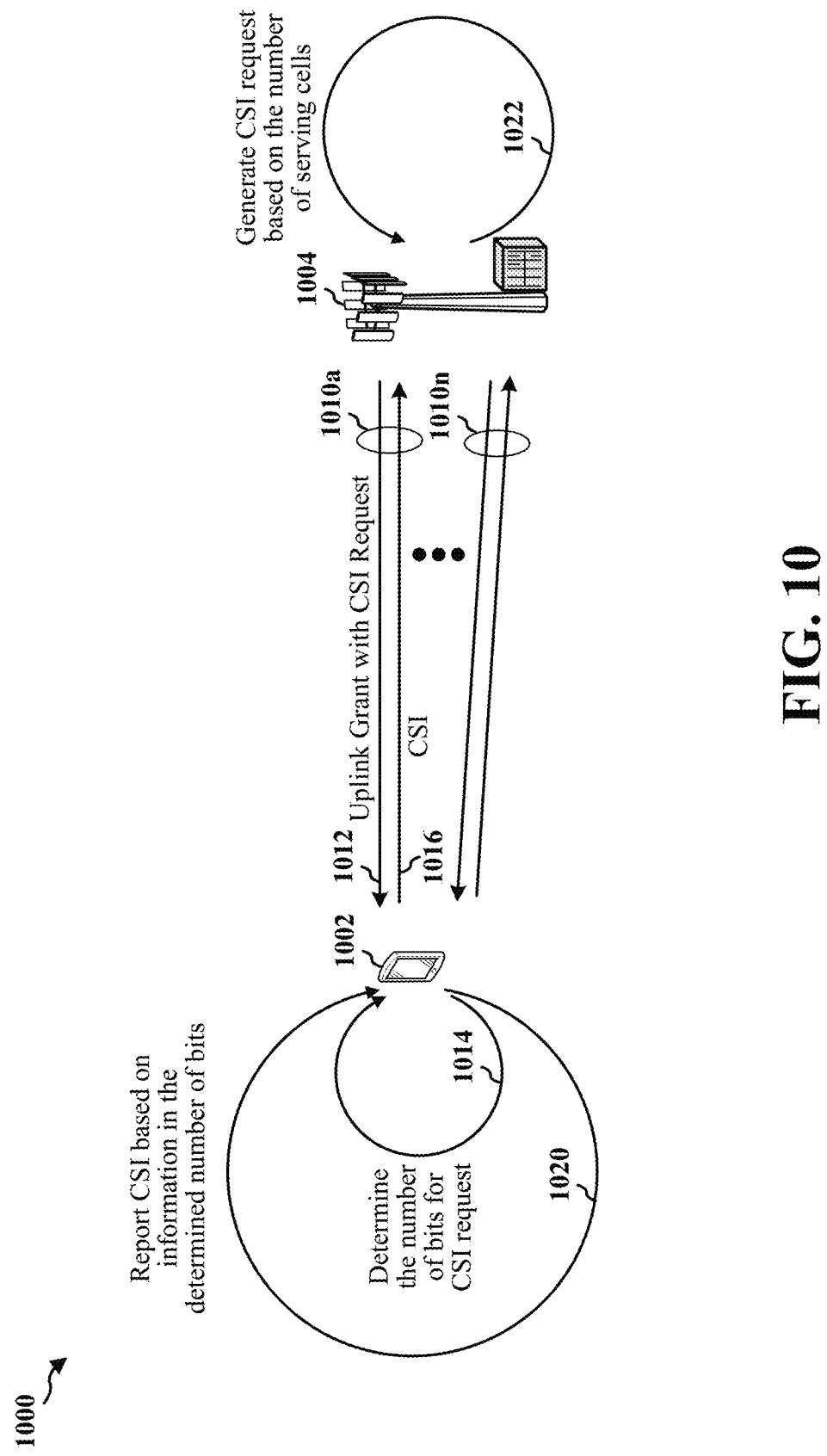
FIG. 10 is a diagram illustrating an example of determining the number of bits for aperiodic CSI request based on the number of serving cells configured for a UE.

FIG. 10 is a diagram 1000 illustrating an example of determining the number of bits for aperiodic CSI request based on the number of serving cells configured for a UE 1002. In this example, the UE 1002 is connected to a base station 1004. The UE 1002 is configured with n serving cells 1010a-1010n. In one configuration, n may be greater than five.

In one configuration, the base station 1004 generates (at 1022) a CSI request for reporting aperiodic CSI from the UE 1002 based on the number of serving cells configured for the UE 1002 (e.g., n). The base station 1004 may determine the number of bits for transmitting the CSI request within an uplink grant based on the number of serving cells configured for the UE 1002. In one configuration, the base station 1004 may determine to use two bits for transmitting the CSI request when the number of serving cells configured for the UE 1002 is less than or equal to a threshold (e.g., five). When the number of serving cells configured for the UE 1002 is greater than the threshold, the base station 1004 may determine to use at least three bits for transmitting the CSI request. In one configuration, the number of bits for transmitting the CSI request may be determined further based on the number of CSI-Reference Signal (CSI-RS) processes configured on at least one of the serving cells.

The base station 1004 may transmit (at 1012) the CSI request with an uplink grant (e.g., the uplink grant 902 described above with reference to FIG. 9) using the number of determined bits, e.g., via the serving cell 1010a. In one configuration, the base station 1004 may receive aperiodic CSI reports for a set of CSI processes for one or more serving cells of the serving cells 1010a-1010n in a subframe. The number of updated CSI reports in the subframe may be less than or equal to a pre-determined maximum number of fresh aperiodic CSI reports when the size of the set of CSI processes is greater than the pre-determined maximum number. Therefore, up to the predetermined maximum number of A-CSI reports in the subframe may be updated CSI reports, the rest of A-CSI reports in the subframe are outdated CSI reports. In one configuration, the base station 1004 may configure a CSI reporting mode with relaxed processing for at least one serving cell of the serving cells 1010a-1010n. Relaxed processing may refer to a condition in which the range of CSI reports for a serving cell is limited. In one configuration, for example, the relaxed processing includes at least one of a wideband CQI report only, or the wideband CQI report along with a wideband PMI report. The base station 1004 can then receive a CSI report from the UE 1002 for the at least one serving cell based on the CSI reporting mode with relaxed processing.

The UE 1002 may determine (at 1014) the number of bits within a received uplink grant that may be used for an aperiodic CSI request based on the number of serving cells configured for the UE 1002 (e.g., n). In one configuration, the number of bits determined for the CSI request may be two when the number of serving cells configured for the UE 1002 is less than or equal to a threshold (e.g., five). When the number of serving cells configured for the UE 1002 is greater than the threshold, the number of bits determined for the CSI request may be at least three.

The UE 1002 may report (at 1020) the aperiodic CSI based on information in the determined number of bits within a particular information field of the received uplink grant. The UE 1002 may send (at 1016) the CSI reports to the base station 1004, e.g., via the serving cell 1010a. In one configuration, the aperiodic CSI may be reported in a subframe for a subset of the serving cells 1010a-101On. The UE 1002 may determine the maximum number of CSI reports that can be updated. In one configuration, this maximum number may be pre-configured by the network. The UE 1002 may update at least one CSI report. The at least one CSI report may be less than or equal to the determined maximum number of CSI reports that can be updated. The reported aperiodic CSI includes the updated at least one CSI report. In one configuration, the UE 1002 may identify a CSI reporting mode with relaxed processing for at least one serving cell configured for the UE, and report CSI for the at least one serving cell based on the CSI reporting mode with relaxed processing. In one configuration, the relaxed processing may include at least one of a wideband CQI report only, or the wideband CQI report along with a wideband PMI report.

Figure 11:
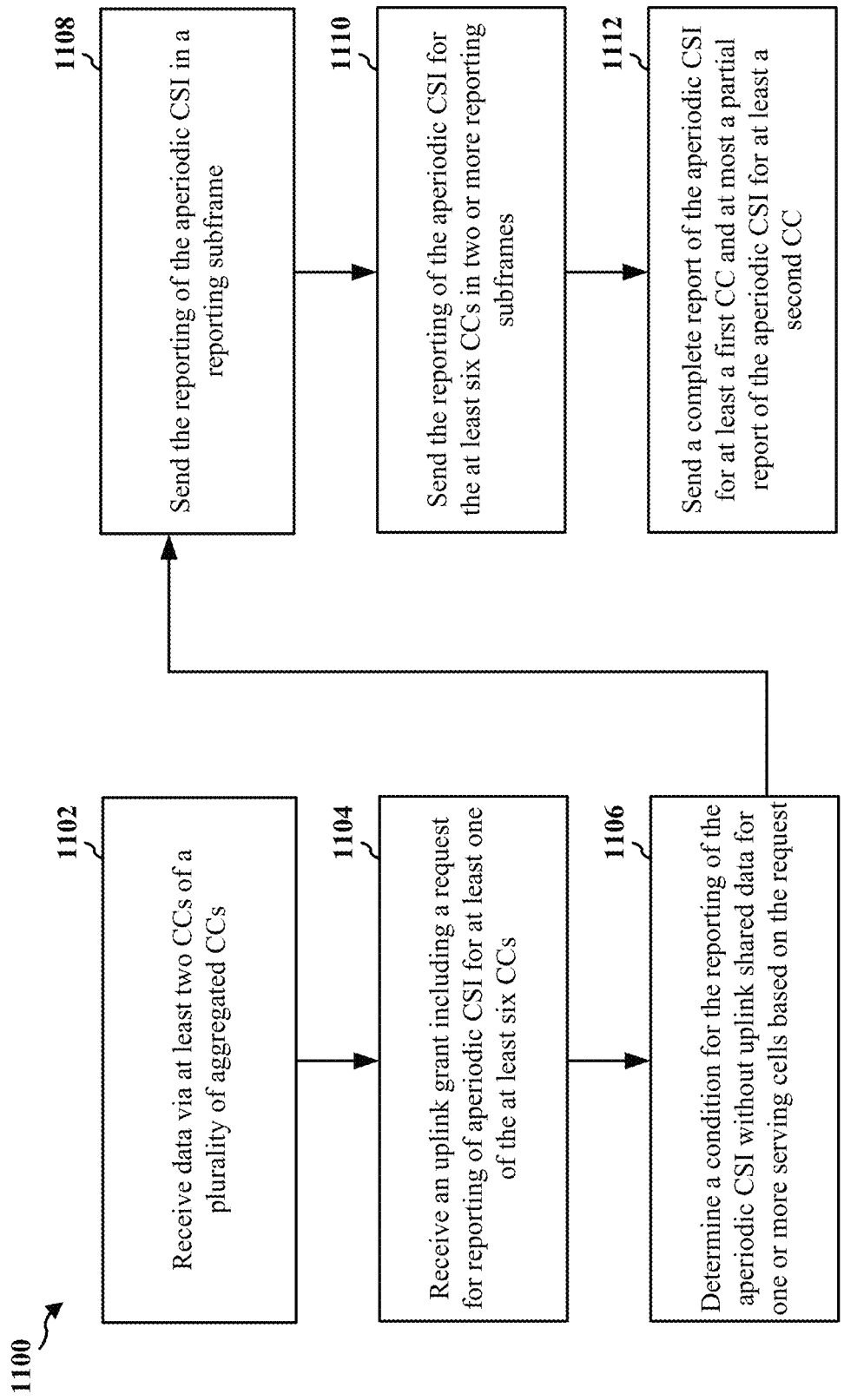
FIG. 11 is a flowchart of a method of wireless communication.

FIG. 11 is a flowchart 1100 of a method of wireless communication. The method may be performed by a UE (e.g., the UE 104, 350, 1002, the apparatus 1402/1402'). FIG. 11 illustrates various embodiments. For example, one embodiment includes performing features of 1102, 1104, and 1108. As another example, another embodiment includes performing features of 1102, 1104, and 1106. As another example, another embodiment includes performing features of 1102, 1104, 1106, and 1108. Any of the noted embodiments may further include performing features of 1110 and/or 1112.

At 1102, the UE receives data via at least two CCs of a plurality of aggregated CCs. For example, the UE receives data via at least two serving cells of the serving cells 1010a-1010n configured for the UE 1002, as described above with reference to FIG. 10. In the present example, the plurality of aggregated CCs includes at least six CCs. At 1104, the UE receives an uplink grant. For example, the UE receives uplink grant 902, as described above with reference to FIG. 9. The uplink grant includes a request for reporting of A-CSI for at least one of the plurality of aggregated CCs. The request may be an information field having a particular length in bits.

With respect to 1106, the UE may determine a condition for the reporting of the A-CSI without uplink shared data for one or more serving cells based on the request. The condition may include the number of RBs, and the number of RBs may be determined based on the number of the one or more serving cells. In one configuration, the number of RBs may be further based on the number of CSI-RS processes triggered for the at least one of the at least six CCs in CA. To determine the condition, the UE may determine the number of the one or more serving cells. Based on the number of the one or more serving cells with which the UE is in communication, the UE may determine the number of RBs for the A-CSI reporting. The UE may set the condition based on the determined number of the plurality of RBs. In conjunction with features of 1106, features of at least 1108, 1110, or 1112 may also be performed. Features of 1108, 1110, and 1112 are described in further detail below.

With respect to 1108, the UE may send the reporting of the A-CSI in a reporting subframe. For example, the UE may send the reporting of the A-CSI in reporting subframe 904, as described above with reference to FIG. 9. In one configuration, the reporting subframe may be offset by a number of subframes with respect to a reference subframe. The number of offsetting subframes may be larger than 4. In one configuration, the number of subframes may be based on at least the number of aggregated CCs, or the number of configured CSI-RS processes.

With respect to 1110, the UE may send the reporting of the A-CSI for the at least six CCs in two or more reporting subframes (e.g., across multiple subframes). For example, the reporting of the A-CSI for at least a first CC may be sent in a first reporting subframe, and the reporting of the A-CSI for at least a second CC may be sent in a second reporting subframe. In one configuration, the first reporting subframe may include an earlier-sent CSI report for the at least a second CC.

With respect to 1112, the UE may send a complete report of the A-CSI for at least a first CC of the at least six CCs and may send at most a partial report of the A-CSI for at least a second CC of the at least six CCs. Relative to the complete report, the partial report may lack frequency selective CQI information, lack frequency selective PMI information, include a reduced set of PMI or rank indicators, include a larger frequency subband size, and/or include a differential CQI value.

In one configuration, the at least a first CC and the at least a second CC may be in the same frequency band. In one configuration, the UE may send a complete report of the aperiodic CSI for at least a third CC of the at least six CCs.

The at least a first CC may correspond to a primary cell and the at least a second CC may correspond to a secondary cell. The at least a third CC may correspond to a second secondary cell. In one configuration, the cell identifier (ID) of the second secondary cell may be higher than the cell ID of the secondary cell.

Figure 12:
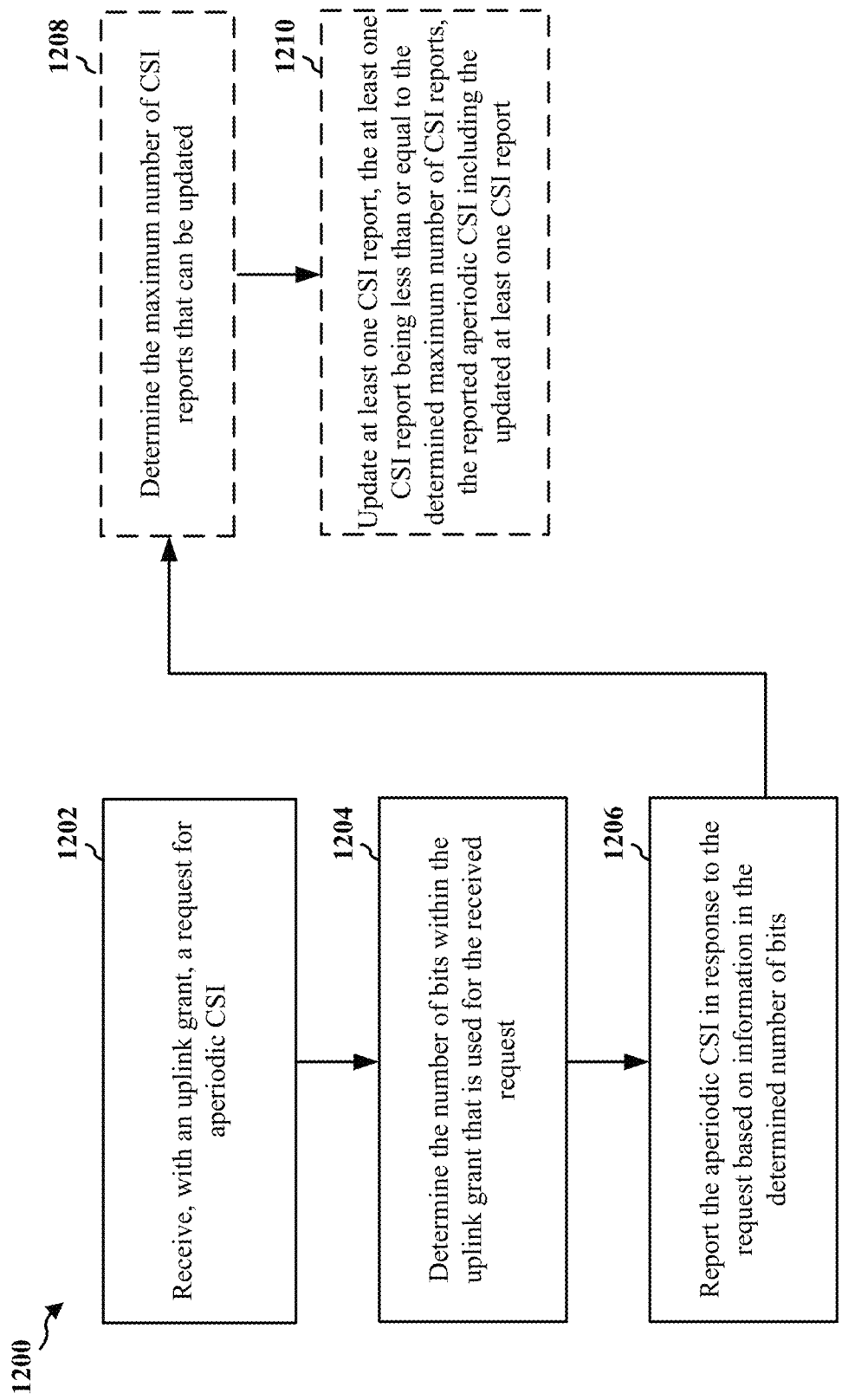
FIG. 12 is a flowchart of a method of reporting A-CSI at a UE based on the number of serving cells configured for the UE.

FIG. 12 is a flowchart 1200 of a method of wireless communication. Specifically, this figure illustrates a method of reporting A-CSI at a UE based on the number of serving cells configured for the UE. The method may be performed by a UE (e.g., the UE 104, 350, 1002, the apparatus 1402/1402'). At 1202, the UE receives, with an uplink grant (e.g., the uplink grant 902), a request for aperiodic CSI. The request may be an information field having a particular length in bits.

At 1204, the UE determines the number of bits within the uplink grant that is used for the received request. For example, the UE determines the number of bits comprising the request. The determined number of bits may be based on or associated with the number of serving cells configured for the UE. For example, the number of bits determined for the request (e.g., the number of bits comprising the request) may be two when the number of serving cells configured for the UE is less than or equal to a threshold (e.g., five). The number of bits determined for the request (e.g., the number of bits comprising the request) may be at least three when the number of serving cells configured for the UE is greater than the threshold. In one configuration, operations performed at 1202 and 1204 may be the operations described above with reference to 1104 of FIG. 11.

At 1206, the UE reports the aperiodic CSI in response to the request based on the determined number of bits. For example, the UE reports the aperiodic CSI in response to the request based on information in the determined number of bits. In one configuration, the aperiodic CSI is reported in a subframe for a subset of the serving cells.

At 1208, the UE may optionally determine the maximum number of CSI reports that can be updated. At 1210, the UE may optionally update at least one CSI report. The at least one CSI report may be less than or equal to the determined maximum number of CSI reports. The reported aperiodic CSI may include the updated at least one CSI report.

In one configuration, the UE may identify a CSI reporting mode with relaxed processing for at least one serving cell configured for the UE. The UE may report CSI for the at least one serving cell based on the CSI reporting mode with relaxed processing. In one configuration, the relaxed processing may include at least one of a wideband CQI report only, or the wideband CQI report along with a wideband precoding matrix indicator report.

Figure 13:
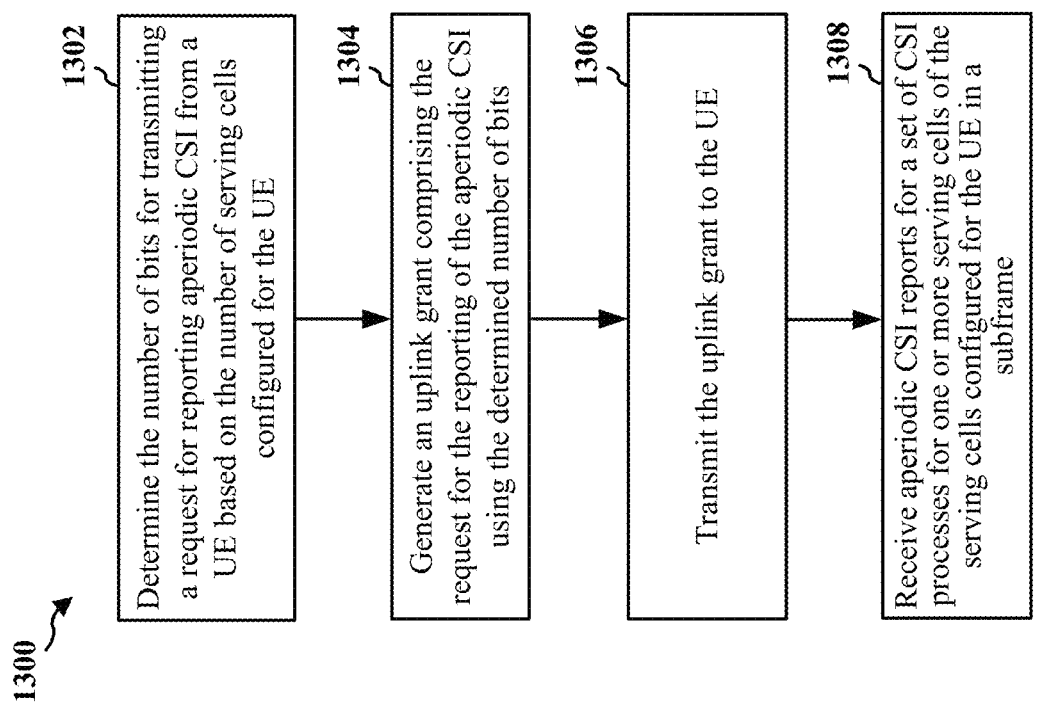
FIG. 13 is a flowchart of a method of requesting A-CSI report from a UE based on the number of serving cells configured for the UE.

FIG. 13 is a flowchart 1300 of a method of wireless communication. Specifically, this figure illustrates a method of requesting A-CSI report from a UE based on the number of serving cells configured for the UE. The method may be performed by a base station (e.g., the base station 102, 310, 1004, the apparatus 1602/1602'). At 1302, the base station determines the number of bits for transmitting a request for reporting aperiodic CSI from a UE (e.g., 1002) based on the number of serving cells configured for the UE. In one configuration, the base station may determine to use two bits for transmitting the request for the reporting of the aperiodic CSI from the UE when the number of serving cells configured for the UE is less than or equal to a threshold (e.g., five). When the number of serving cells configured for the UE is greater than the threshold, the base station may determine to use at least three bits for transmitting the request for the reporting of the aperiodic CSI from the UE.

In one configuration, the number of bits for transmitting the request for reporting of aperiodic CSI from the UE may be determined further based on the number of CSI-RS processes configured on at least one of the serving cells.

At 1304, the base station generates an uplink grant comprising the request for the reporting of the aperiodic CSI based on or using the determined number of bits. At 1306, the base station transmits the uplink grant (e.g., 902) to the UE.

At 1308, the base station receives aperiodic CSI reports for a set of CSI processes for one or more serving cells of the serving cells configured for the UE in a subframe. In one configuration, the number of updated CSI reports in the subframe may be less than or equal to a pre-determined maximum number of fresh aperiodic CSI reports when the size of the set of CSI processes is greater than the pre-determined maximum number.

In one configuration, the base station may configure a CSI reporting mode with relaxed processing for at least one serving cell of the serving cells configured for the UE. The base station may receive a CSI report for the at least one serving cell based on the CSI reporting mode with relaxed processing from the UE. The relaxed processing may include at least one of a wideband CQI report only, or the wideband CQI report along with a wideband PMI report.

Figure 14:
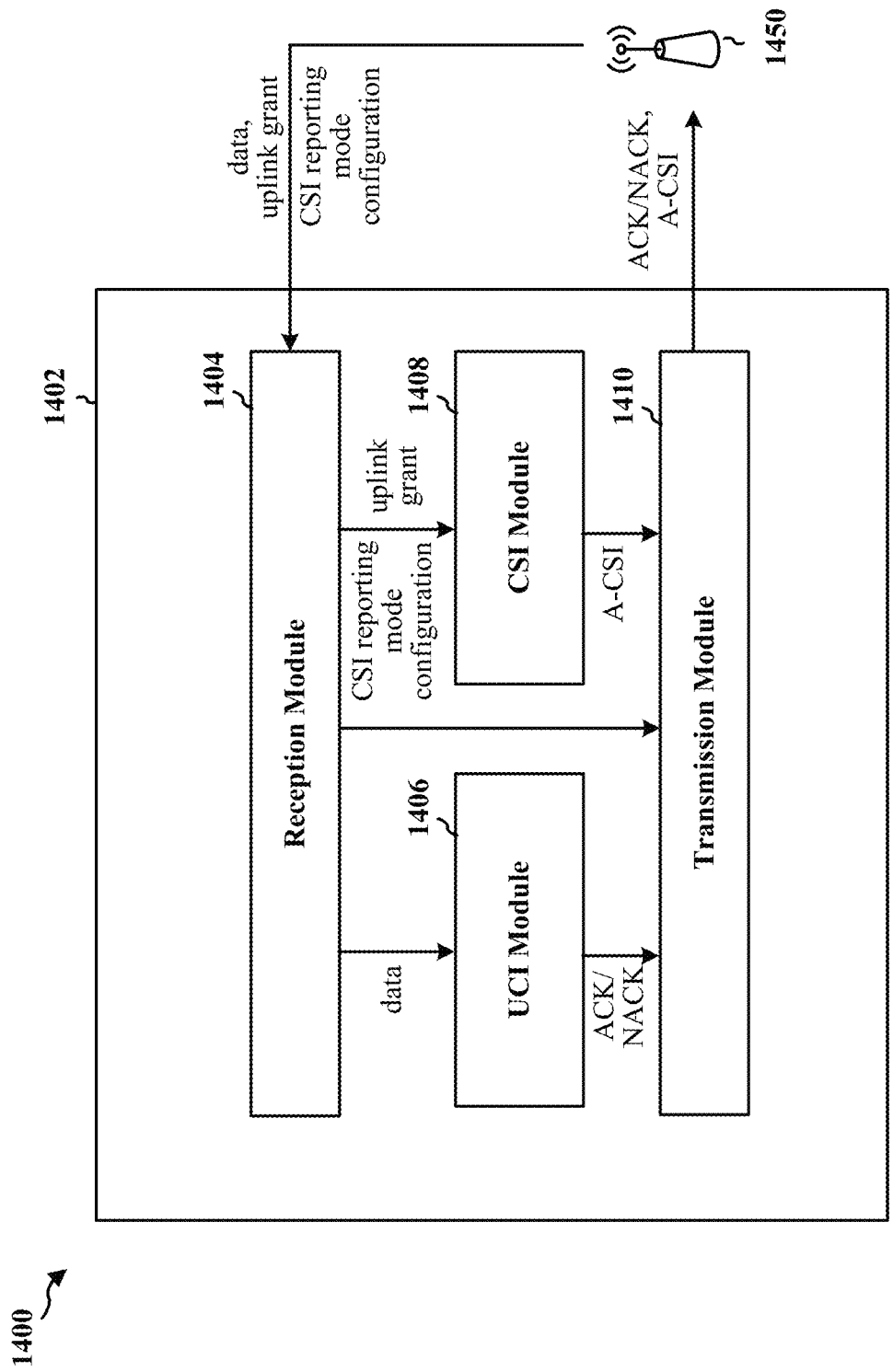
FIG. 14 is a conceptual data flow diagram illustrating the data flow between different means/components in an exemplary apparatus.

FIG. 14 is a conceptual data flow diagram 1400 illustrating the data flow between different modules/means/components in an exemplary apparatus 1402. The apparatus may be a UE. The apparatus 1402 may include a reception module 1404 that receives data via at least two CCs (e.g., from eNB 1450). The reception module 1404 may also receive uplink grant including a request for reporting of A-CSI and CSI reporting mode configuration from the eNB 1450. The apparatus 1402 may include a transmission module 1410 that sends ACK/NACK feedback for the data received, along with at least a PUSCH. The transmission module 1410 may also send A-CSI report to the eNB 1450. The reception module 1404 and the transmission module 1410 may work together to manage the communications of the apparatus 1402.

The apparatus 1402 may include a UCI module 1406 that determines resources for UCI feedback (e.g., ACK/NACK) based on the number of serving cells configured for the apparatus 1402. The UCI module 1406 may receive data from the reception module 1404 and generate ACK/NACK for the received data. The generated ACK/NACKs are sent to the transmission module 1410.

The apparatus 1402 may include a CSI module 1408 that reports A-CSI. The CSI module 1408 may receive an uplink grant including a CSI request from the reception module 1404. The CSI module 1408 may receive CSI reporting mode configuration from the reception module 1404. The CSI Module may generate A-CSI report accordingly and send the generated A-CSI report to the transmission module 1410.

The apparatus may include additional modules that perform each of the blocks of the algorithm in the aforementioned flowcharts of FIGS. 8, 11 and 12. As such, each block in the aforementioned flowcharts of FIGS. 8, 11 and 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
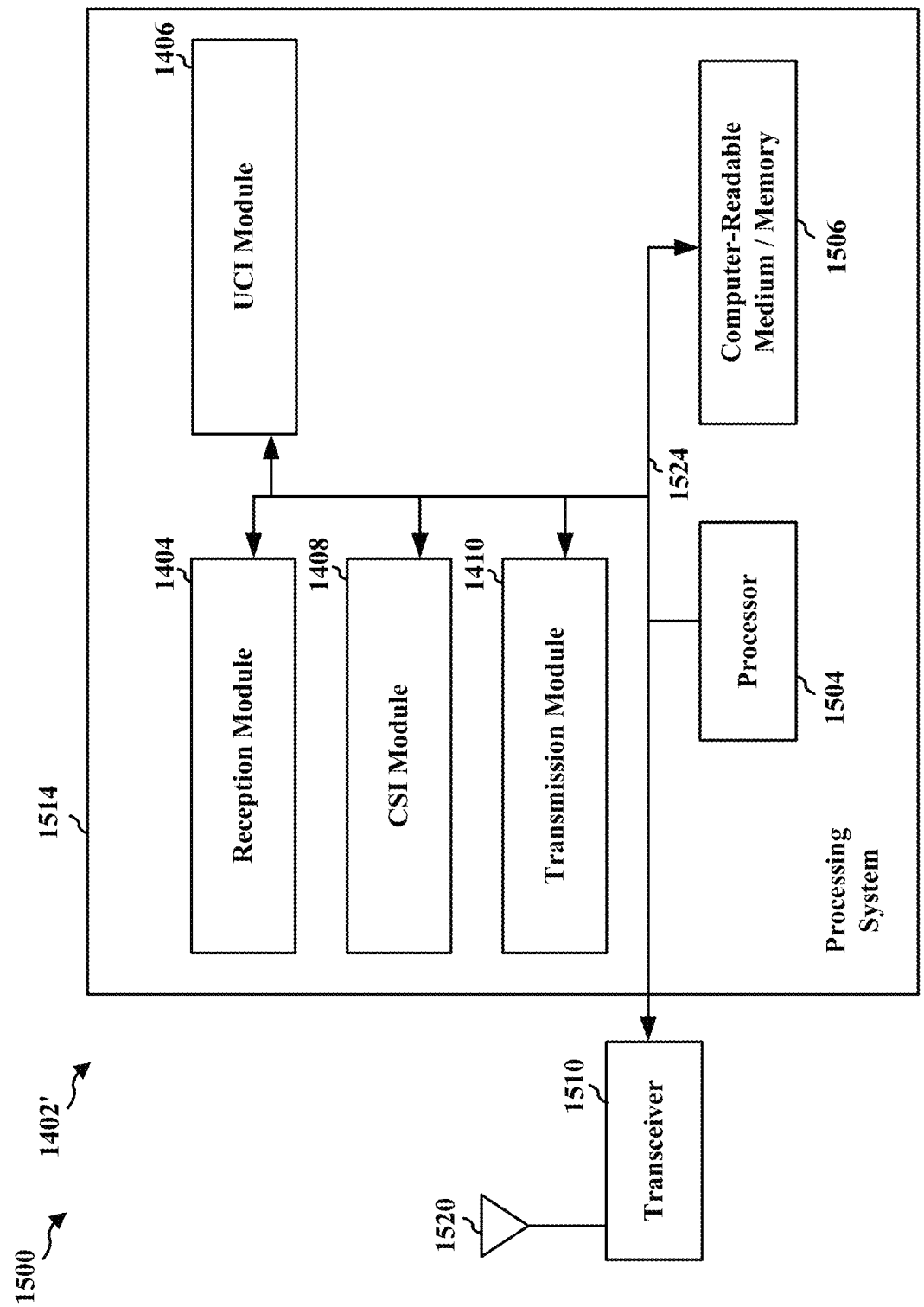
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1404. In addition, the transceiver 1510 receives information from the processing system 1514, specifically the transmission module 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1408, 1410. The modules may be software modules running in the processor 1504, resident/stored in the computer readable medium/memory 1506, one or more hardware modules coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means (e.g., 1404, 1504, 1510, or 1520) for receiving data via at least two CCs of a plurality of aggregated CCs. The plurality of aggregated CCs includes at least six CCs. The apparatus 1402/1402' also includes means (e.g., 1410, 1504, 1510, or 1520) for sending ACK/NACK feedback for the data received via the plurality of aggregated CCs based on a number of CCs of the plurality of aggregated CCs, along with at least a PUSCH.

The ACK/NACK feedback for the received data may be sent on the PUSCH. The ACK/NACK feedback may occupy at least five symbols of a slot of a subframe. The at least five symbols may include at least one RI symbol of the subframe. The ACK/NACK feedback may be jointly coded with at least P-CSI or A-CSI provided on the PUSCH. The PUSCH may be present in an uplink subframe that is associated with one or more downlink subframes, and a higher layer signaled index may be configured based on a number of the one or more downlink subframes. The ACK/NACK feedback for the data received may be sent on a PUCCH, and the PUSCH and the PUCCH may be in a same subframe.

In one configuration, the apparatus 1402/1402' for wireless communication includes means (e.g., 1404, 1504, 1510, or 1520) for receiving data via at least two CCs of a plurality of aggregated CCs. The plurality of aggregated CCs includes at least six CCs. The apparatus 1402/1402' also includes means (e.g., 1404, 1504, 1510, or 1520) for receiving an uplink grant comprising a request for reporting of A-CSI for at least one of the at least six CCs.

A length of the request for the reporting of A-CSI may be greater than 2 bits. The length of the request may be based on a number of the at least six CCs. The length of the request may be equal to 3 bits if the number of the at least six CCs is less than or equal to a threshold value, and the length of the request may be equal to 4 bits if the number of the at least six CCs is greater than the threshold value. The length of the request may be further based on a number of CSI-RS processes configured on the at least one of the at least six CCs. The length of the request may be equal to 3 bits if a sum of the number of the at least six CCs and the number of the CSI-RS processes is less than or equal to a threshold value, and the length of the request may be equal to 4 bits if the sum of the number of the at least six CCs and the number of the CSI-RS processes is greater than the threshold value.

The apparatus 1402/1402' may also include means (e.g., 1408 or 1504) for determining a condition for the reporting of the aperiodic CSI without uplink shared data for one or more serving cells based on the request. The condition may include a number of a plurality of RBs, and the number of the plurality of RBs is determined based on a number of the one or more serving cells. The number of the plurality of RBs may be further based on a number of CSI-RS processes triggered for the at least one of the at least six CCs. According to particular configurations, the apparatus 1402/1402' including means (e.g., 1408 or 1504) for determining the condition for the reporting of the aperiodic CSI further includes at least means (e.g., 1410, 1504, 1510, or 1520) for sending the reporting of the aperiodic CSI in a reporting subframe, means (e.g., 1410, 1504, 1510, or 1520) for sending the reporting of the aperiodic CSI for the at least six CCs in two or more reporting subframes, or means (e.g., 1410, 1504, 1510, or 1520) for sending a complete report of the aperiodic CSI for at least a first CC of the at least six CCs, and means (e.g., 1410, 1504, 1510, or 1520) for sending at most a partial report of the aperiodic CSI for at least a second CC of the at least six CCs. The noted additional means will be described in further detail below.

The apparatus 1402/1402' may also include means (e.g., 1410, 1504, 1510, or 1520) for sending the reporting of the aperiodic CSI in a reporting subframe. The reporting subframe may be offset by a number of subframes with respect to a reference subframe. The number of subframes may be larger than 4. The number of subframes may be based on at least a number of aggregated CCs, or a number of configured CSI-RS processes.

The apparatus 1402/1402' may also include means (e.g., 1410, 1504, 1510, or 1520) for sending the reporting of the aperiodic CSI for the at least six CCs in two or more reporting subframes. The means for sending the reporting of the aperiodic CSI may be configured to send the reporting of the aperiodic CSI for at least a first CC of the at least six CCs in a first reporting subframe, and send the reporting of the aperiodic CSI for at least a second CC of the at least six CCs in a second reporting subframe. The first reporting subframe may include an earlier-sent CSI report for the at least a second CC.

The apparatus 1402/1402' may also include means (e.g., 1410, 1504, 1510, or 1520) for sending a complete report of the aperiodic CSI for at least a first CC of the at least six CCs, and means (e.g., 1410, 1504, 1510, or 1520) for sending at most a partial report of the aperiodic CSI for at least a second CC of the at least six CCs. The at least a first CC and the at least a second CC may be in the same frequency band. The at least a first CC may correspond to a primary cell, and the at least a second CC may correspond to a secondary cell. The means for sending a complete report may be configured to send a complete report of the aperiodic CSI for at least a third CC of the at least six CCs, and the at least a third CC may correspond to a second secondary cell. A cell identifier (ID) of the second secondary cell may be higher than a cell ID of the secondary cell. The partial report may at least lack frequency selective CQI information, lack frequency selective PMI information, include a reduced set of PMI or rank indicators, include a larger frequency subband size, and/or include a differential CQI value.

The apparatus 1402/1402' may include means (e.g., 1404, 1504, 1510, or 1520) for receiving a request for aperiodic CSI. In one configuration, the means for receiving a request for aperiodic CSI may perform operations described above with reference to 1202 of FIG. 12.

The apparatus 1402/1402' may include means (e.g., 1408 or 1504) for determining a number of bits comprising the request. In one configuration, the means for determining a number of bits comprising the request may perform operations described above with reference to 1204 of FIG. 12.

The apparatus 1402/1402' may include means (e.g., 1408 or 1504) for reporting the aperiodic CSI in response to the request based on the determined number of bits. In one configuration, the means for reporting the aperiodic CSI in response to the request based on the determined number of bits may perform operations described above with reference to 1206 of FIG. 12.

The apparatus 1402/1402' may include means (e.g., 1408 or 1504) for determining a maximum number of CSI reports that can be updated. In one configuration, the means for determining a maximum number of CSI reports that can be updated may perform operations described above with reference to 1208 of FIG. 12.

The apparatus 1402/1402' may include means (e.g., 1408 or 1504) for updating at least one CSI report. In one configuration, the means for updating at least one CSI report may perform operations described above with reference to 1210 of FIG. 12.

The apparatus 1402/1402' may include means (e.g., 1408 or 1504) for identifying a CSI reporting mode with relaxed processing for at least one serving cell configured for the UE. The apparatus 1402/1402' may include means (e.g., 1408 or 1504) for reporting CSI for the at least one serving cell based on the CSI reporting mode with relaxed processing.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
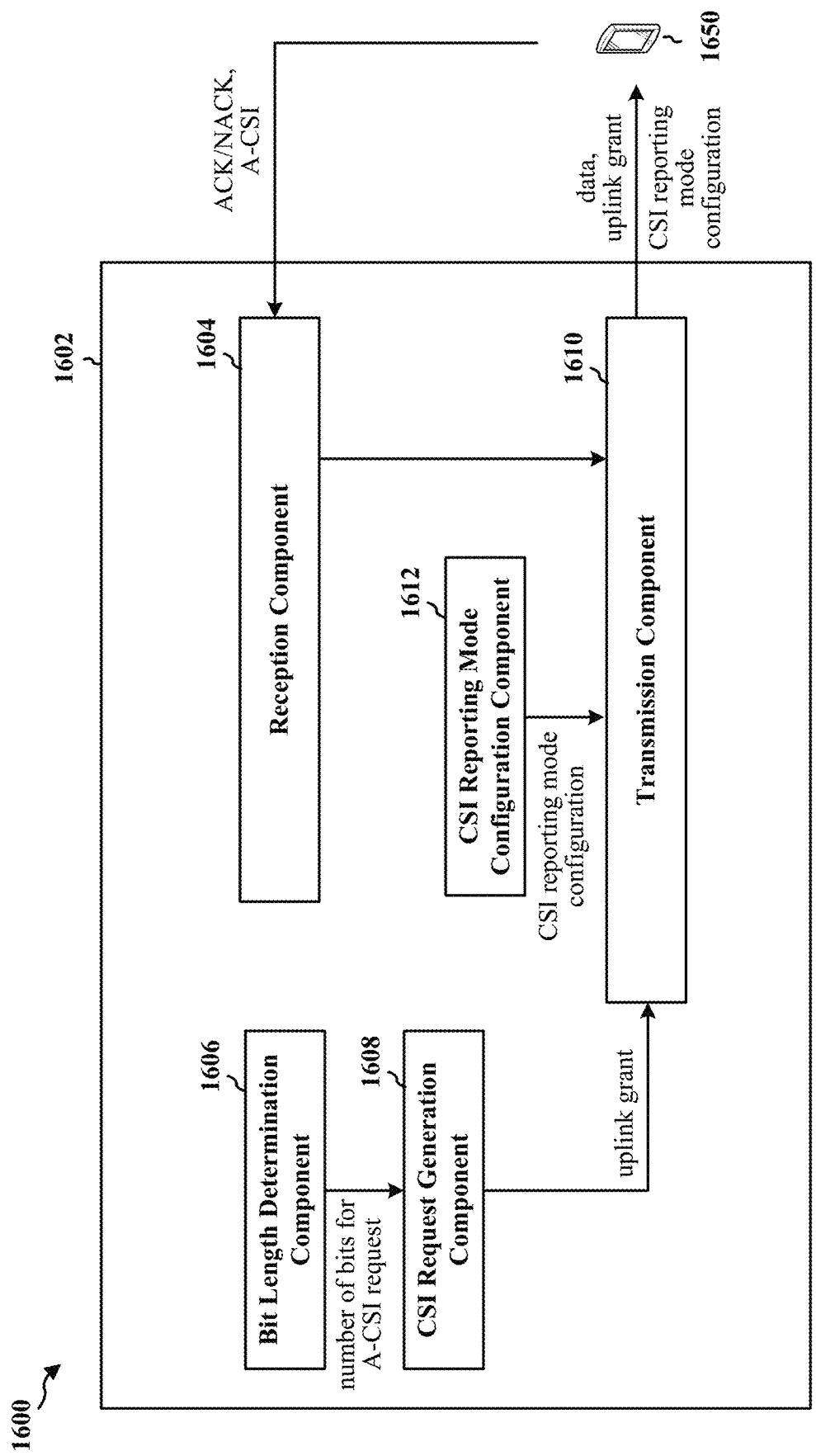
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be an eNB. The apparatus 1602 includes a reception component 1604 that may receive UCI feedback (e.g., ACK/NACK) from a UE 1650. The reception component may receive A-CSI reports from the UE 1650. The apparatus 1602 includes a transmission component 1610 that sends data to the UE 1650. The transmission component 1610 may send an uplink grant including an A-CSI request to the UE 1650. The transmission component 1610 may send a CSI reporting mode configuration to the UE 1650. The reception component 1604 and the transmission component 1610 may work together to manage the communications of the apparatus 1602.

The apparatus 1602 may include a bit length determination component 1606 that determines the number of bits for transmitting a request for reporting A-CSI from the UE 1620 based on the number of serving cells configured for the UE 1650.

The apparatus 1602 may include a CSI request generation component 1608 that generates CSI request using the number of bits determined by the bit length determination component 1606. The generated CSI request may be within an uplink grant. The CSI request generation component 1608 sends the uplink grant to the transmission component 1610.

The apparatus 1602 may include a CSI reporting mode configuration component 1612 that configures a CSI reporting mode with relaxed processing for at least one serving cell of the serving cells configured for the UE 1650. The CSI reporting mode configuration component 1612 sends the CSI reporting mode configuration (e.g., with relaxed processing) to the transmission component 1610.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
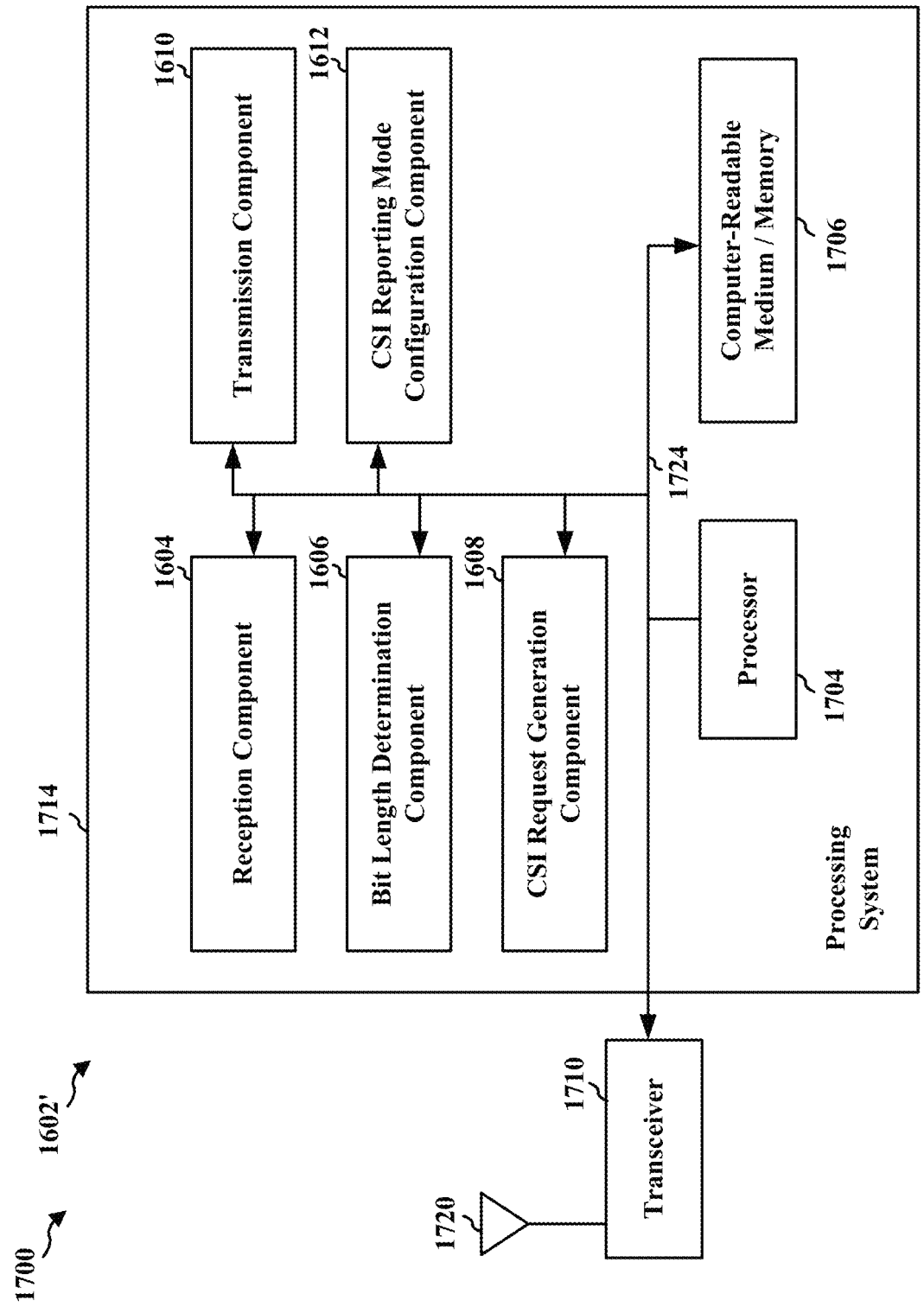
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means (e.g., 1606 or 1704) for determining the number of bits for requesting A-CSI from a UE based on the number of serving cells configured for the UE. In one configuration, the means for determining the number of bits for requesting A-CSI from a UE based on the number of serving cells configured for the UE may perform operations described above with reference to 1302 of FIG. 13.

In one configuration, the means for determining the number of bits may be configured to determine to use two bits for transmitting the request for the reporting of the aperiodic CSI from the UE when the number of serving cells configured for the UE is less than or equal to a threshold. In one configuration, the means for determining the number of bits may be further configured to determine to use at least three bits for transmitting the request for the reporting of the aperiodic CSI from the UE when the number of serving cells configured for the UE is greater than the threshold.

In one configuration, the apparatus 1602/1602' may include means (e.g., 1608 or 1704) for generating an uplink grant comprising a request for the aperiodic CSI based on the determined number of bits. In one configuration, the means for generating an uplink grant comprising a request for the aperiodic CSI based on the determined number of bits may perform operations described above with reference to 1304 of FIG. 13.

In one configuration, the apparatus 1602/1602' may include means (e.g., 1610, 1704, 1710, or 1720) for transmitting the uplink grant to the UE. In one configuration, the means for transmitting the uplink grant to the UE may perform operations described above with reference to 1306 of FIG. 13.

In one configuration, the apparatus 1602/1602' may include means (e.g., 1604, 1704, 1710, or 1720) for receiving aperiodic CSI reports for a set of CSI processes for one or more serving cells of the serving cells configured for the UE in a subframe. In one configuration, the means for receiving aperiodic CSI reports for a set of CSI processes for one or more serving cells of the serving cells configured for the UE in a subframe may perform operations described above with reference to 1308 of FIG. 13.

In one configuration, the apparatus 1602/1602' may include means (e.g., 1612 or 1704) for configuring a CSI reporting mode with relaxed processing for at least one serving cell of the serving cells configured for the UE. In one configuration, the apparatus 1602/1602' may include means (e.g., 1604, 1704, 1710, or 1720) for receiving a CSI report for the at least one serving cell based on the CSI reporting mode with relaxed processing from the UE.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, with an uplink grant, a request for channel state information (CSI);
   comparing a number of serving cells configured for the UE to a threshold;
   determining a number of bits comprising the request based on the comparison of the number of serving cells configured for the UE to the threshold;
   determining a maximum number of aperiodic CSI reports that can be updated; and
   reporting the CSI in response to the request based on the determined number of bits and based on the maximum number of aperiodic CSI reports that can be updated, wherein the CSI includes current reporting of aperiodic CSI for up to a pre-determined maximum number of CSI processes and outdated reporting of aperiodic CSI for remaining CSI processes.

2. The method of claim 1, wherein the UE determines the number of bits comprising the request to be at least three bits when the number of serving cells configured for the UE is greater than the threshold.

3. The method of claim 2, wherein the threshold is five.

4. The method of claim 1, wherein the reporting of the CSI comprises reporting the CSI in a subframe for a subset of the serving cells configured for the UE.

5. The method of claim 1, further comprising:
   identifying a CSI reporting mode with relaxed processing for at least one serving cell configured for the UE; and
   reporting CSI for the at least one serving cell based on the CSI reporting mode with relaxed processing.

6. The method of claim 5, wherein the relaxed processing comprises at least one of a wideband CQI report, or the wideband CQI report with a wideband precoding matrix indicator report.

7. A method of wireless communication of a base station, comprising:
   comparing a number of serving cells configured for a user equipment (UE) to a threshold;
   determining a number of bits for requesting channel state information (CSI) from the UE based on the comparison of the number of serving cells configured for the UE to the threshold;
   generating an uplink grant comprising a request for the CSI based on the determined number of bits;
   transmitting the uplink grant to the UE; and
   receiving the CSI in response to the uplink grant and based on a maximum number of aperiodic CSI reports that can be updated, wherein the CSI includes current reporting of aperiodic CSI for up to a pre-determined maximum number of CSI processes and outdated reporting of aperiodic CSI for remaining CSI processes.

8. The method of claim 7, wherein the determining of the number of bits comprises determining to use at least three bits for the request when the number of serving cells configured for the UE is greater than the threshold.

9. The method of claim 8, wherein the threshold is five.

10. The method of claim 7, wherein the number of bits comprising the request is further associated with a number of CSI-RS processes configured on at least one of the serving cells.

11. The method of claim 7, further comprising:
    configuring a CSI reporting mode with relaxed processing for at least one serving cell of the serving cells configured for the UE; and
    receiving a CSI report for the at least one serving cell based on the CSI reporting mode with relaxed processing from the UE.

12. The method of claim 11, wherein the relaxed processing comprises at least one of a wideband CQI report, or the wideband CQI report with a wideband precoding matrix indicator report.

13. An apparatus for wireless communication, the apparatus being a user equipment (UE), comprising:
    means for receiving, with an uplink grant, a request for channel state information (CSI);
    means for comparing a number of serving cells configured for the UE to a threshold and determining a number of bits comprising the request based on the comparison of the number of serving cells configured for the UE to the threshold;
    means for determining a maximum number of aperiodic CSI reports that can be updated; and
    means for reporting the CSI in response to the request based on the determined number of bits and based on the maximum number of aperiodic CSI reports that can be updated, wherein the CSI includes current reporting of aperiodic CSI for up to a pre-determined maximum number of CSI processes and outdated reporting of aperiodic CSI for remaining CSI processes.

14. The apparatus of claim 13, wherein the apparatus determines the number of bits comprising the request to be at least three bits when the number of serving cells configured for the UE is greater than the threshold.

15. The apparatus of claim 14, wherein the threshold is five.

16. The apparatus of claim 13, wherein the means for reporting the CSI is configured to report the CSI in a subframe for a subset of the serving cells configured for the UE.

17. The apparatus of claim 13, further comprising:
    means for identifying a CSI reporting mode with relaxed processing for at least one serving cell configured for the UE; and
    means for reporting CSI for the at least one serving cell based on the CSI reporting mode with relaxed processing.

18. The apparatus of claim 17, wherein the relaxed processing comprises at least one of a wideband CQI report, or the wideband CQI report with a wideband precoding matrix indicator report.

19. An apparatus for wireless communication, the apparatus being a base station, comprising:
    means for comparing a number of serving cells configured for a user equipment (UE) to a threshold and determining a number of bits for requesting channel state information (CSI) from the UE based on the comparison of the number of serving cells configured for the UE to the threshold;
    means for generating an uplink grant comprising a request for the CSI based on the determined number of bits;
    means for transmitting the uplink grant to the UE; and
    means for receiving the CSI in response to the uplink grant and based on a maximum number of aperiodic CSI reports that can be updated, wherein the CSI includes current reporting of aperiodic CSI for up to a pre-determined maximum number of CSI processes and outdated reporting of aperiodic CSI for remaining CSI processes.

20. The apparatus of claim 19, wherein the means for determining the number of bits is configured to determine to use at least three bits for the request when the number of serving cells configured for the UE is greater than the threshold.

21. The apparatus of claim 20, wherein the threshold is five.

22. The apparatus of claim 19, wherein the number of bits comprising the request is further associated with a number of CSI-RS processes configured on at least one of the serving cells.

23. The apparatus of claim 19, further comprising:
means for configuring a CSI reporting mode with relaxed processing for at least one serving cell of the serving cells configured for the UE; and
means for receiving a CSI report for the at least one serving cell based on the CSI reporting mode with relaxed processing from the UE.

24. The apparatus of claim 23, wherein the relaxed processing comprises at least one of a wideband CQI report, or the wideband CQI report with a wideband precoding matrix indicator report.

25. An apparatus for wireless communication, the apparatus being a user equipment (UE), comprising:
a memory; and
at least one processor coupled to the memory and configured to:
receive, with an uplink grant, a request for channel state information (CSI);
compare a number of serving cells configured for the UE to a threshold;
determine a number of bits comprising the request based on the comparison of the number of serving cells configured for the UE to the threshold;
determine a maximum number of aperiodic CSI reports that can be updated; and
report the CSI in response to the request based on the determined number of bits and based on the maximum number of aperiodic CSI reports that can be updated, wherein the CSI includes current reporting of aperiodic CSI for up to a pre-determined maximum number of CSI processes and outdated reporting of aperiodic CSI for remaining CSI processes.

26. The apparatus of claim 25, wherein the apparatus determines the number of bits comprising the request to be at least three bits when the number of serving cells configured for the UE is greater than the threshold.

27. The apparatus of claim 26, wherein the threshold is five.

28. The apparatus of claim 25, wherein, to report the CSI, the at least one processor is configured to report the CSI in a subframe for a subset of the serving cells configured for the UE.

29. The apparatus of claim 25, wherein the at least one processor is further configured to:
identify a CSI reporting mode with relaxed processing for at least one serving cell configured for the UE; and
report CSI for the at least one serving cell based on the CSI reporting mode with relaxed processing.

30. The apparatus of claim 29, wherein the relaxed processing comprises at least one of a wideband CQI report, or the wideband CQI report with a wideband precoding matrix indicator report.

31. An apparatus for wireless communication, the apparatus being a base station, comprising:
a memory; and
at least one processor coupled to the memory and configured to:
compare a number of serving cells configured for a user equipment (UE) to a threshold;
determine a number of bits for requesting channel state information (CSI) from the UE based on the comparison of the number of serving cells configured for the UE to the threshold;
generate an uplink grant comprising a request for the CSI based on the determined number of bits;
transmit the uplink grant to the UE; and
receive the CSI in response to the uplink grant and based on a maximum number of aperiodic CSI reports that can be updated, wherein the CSI includes current reporting of aperiodic CSI for up to a pre-determined maximum number of CSI processes and outdated reporting of aperiodic CSI for remaining CSI processes.

32. The apparatus of claim 31, wherein, to determine the number of bits, the at least one processor is configured to determine to use at least three bits for the request when the number of serving cells configured for the UE is greater than the threshold.

33. The apparatus of claim 32, wherein the threshold is five.

34. The apparatus of claim 31, wherein the number of bits comprising the request is further associated with a number of CSI-RS processes configured on at least one of the serving cells.

35. The apparatus of claim 31, wherein the at least one processor is further configured to:
configure a CSI reporting mode with relaxed processing for at least one serving cell of the serving cells configured for the UE; and
receive a CSI report for the at least one serving cell based on the CSI reporting mode with relaxed processing from the UE.

36. The apparatus of claim 35, wherein the relaxed processing comprises at least one of a wideband CQI report, or the wideband CQI report with a wideband precoding matrix indicator report.

37. A non-transitory computer-readable medium storing computer executable code, comprising code to:
receive, with an uplink grant, a request for channel state information (CSI);
compare a number of serving cells configured for the UE to a threshold;
determine a number of bits comprising the request based on the comparison of the number of serving cells configured for the UE to the threshold;
determine a maximum number of aperiodic CSI reports that can be updated; and
report the CSI in response to the request based on the determined number of bits and based on the maximum number of aperiodic CSI reports that can be updated, wherein the CSI includes current reporting of aperiodic CSI for up to a pre-determined maximum number of CSI processes and outdated reporting of aperiodic CSI for remaining CSI processes.

38. A non-transitory computer-readable medium storing computer executable code, comprising code to:
compare a number of serving cells configured for a user equipment (UE) to a threshold;

determine a number of bits for requesting channel state information (CSI) from the UE based on the comparison of the number of serving cells configured for the UE to the threshold;

generate an uplink grant comprising a request for the CSI based on the determined number of bits;

transmit the uplink grant to the UE; and receive the CSI in response to the uplink grant and based on a maximum number of aperiodic CSI reports that can be updated, wherein the CSI includes current reporting of aperiodic CSI for up to a pre-determined maximum number of CSI processes and outdated reporting of aperiodic CSI for remaining CSI processes.

39. The method of claim 1, wherein the UE determines a first number of bits comprising the request when the number of serving cells configured for the UE is above the threshold, and wherein the UE determines a second number of bits comprising the request when the number of serving cells configured for the UE is below the threshold.

40. The method of claim 2, wherein the UE determines the number of bits comprising the request to be two bits when the number of serving cells configured for the UE is less than the threshold.

41. The method of claim 7, wherein the base station determines to use a first number of bits for the request when the number of serving cells configured for the UE is above the threshold, and wherein the UE determines to use a second number of bits for the request when the number of serving cells configured for the UE is below the threshold.

42. The method of claim 8, wherein the base station determines to use two bits for the request when the number of serving cells configured for the UE is less than the threshold.

* * * * *